(12) United States Patent
Abhyanker

(10) Patent No.: US 9,098,545 B2
(45) Date of Patent: Aug. 4, 2015

(54) HOT NEWS NEIGHBORHOOD BANTER IN A GEO-SPATIAL SOCIAL NETWORK

(75) Inventor: Raj Vasant Abhyanker, Cupertino, CA (US)

(73) Assignee: Raj Abhyanker, Mountain View, CA (US)

( * ) Notice: Subject to any disclaimer, the term of this patent is extended or adjusted under 35 U.S.C. 154(b) by 971 days.

(21) Appl. No.: 11/827,400

(22) Filed: Jul. 10, 2007

(65) Prior Publication Data

US 2009/0019085 A1 Jan. 15, 2009

(51) Int. Cl.
G06F 17/00 (2006.01)
G06F 17/30 (2006.01)
G06Q 10/10 (2012.01)

(52) U.S. Cl.
CPC .......... *G06F 17/30386* (2013.01); *G06Q 10/10* (2013.01)

(58) Field of Classification Search
CPC ................................................ G06F 17/30017
USPC ........................................................ 715/201
See application file for complete search history.

(56) References Cited

U.S. PATENT DOCUMENTS

| | | | |
|---|---|---|---|
| 2,035,218 A | 3/1936 | Isaac | |
| 3,253,806 A | 5/1966 | Eickmann | |
| 3,556,438 A | 1/1971 | Meditz | |
| 3,762,669 A | 10/1973 | Curci | |
| 4,119,163 A | 10/1978 | Ball | |
| 4,161,843 A | 7/1979 | Hui | |
| 4,375,354 A | 3/1983 | Henriksson | |
| 4,556,198 A | 12/1985 | Tominaga | |
| 4,779,203 A | 10/1988 | McClure et al. | |
| 4,914,605 A | 4/1990 | Loughmiller, Jr. et al. | |
| 4,996,468 A | 2/1991 | Field et al. | |
| 5,032,989 A | 7/1991 | Tornetta | |
| 5,050,844 A | 9/1991 | Hawk | |
| 5,199,686 A | 4/1993 | Fletcher | |
| 5,208,750 A | 5/1993 | Kurami et al. | |

(Continued)

FOREIGN PATENT DOCUMENTS

| | | |
|---|---|---|
| EP | 1426876 A1 | 6/2004 |
| WO | 9808055 A1 | 2/1998 |

(Continued)

OTHER PUBLICATIONS

Chen et al., Geotracker: Geospatial and Temporal RSS Navigation, p. 41-50 (World Wide Web Conference 2007, ACM, May 8-12, 2007).*

(Continued)

*Primary Examiner* — Frank D Mills
(74) *Attorney, Agent, or Firm* — Raj Abhyanker, P.C.

(57) ABSTRACT

A method and system of hot news neighborhood banter in a geo-spatial social network are disclosed. In one aspect, a method includes identifying a hot news story, associating the hot news story with a specific geographic location, generating a map concurrently displaying a headline of the hot news story and the specific geographic location, and simultaneously generating in the map, profiles associated with a plurality of users surrounding the specific geographic location associated with the hot news story. The method may further include processing a submission form, having an audio file, a video file, a photo, and/or a comment, associated with the hot news story, of a neighboring user located a threshold distance away from the specific geographic location of the hot news story.

27 Claims, 15 Drawing Sheets

(56) References Cited

U.S. PATENT DOCUMENTS

| | | | |
|---|---|---|---|
| 5,325,294 A | 6/1994 | Keene |
| 5,372,211 A | 12/1994 | Wilcox et al. |
| 5,521,817 A | 5/1996 | Burdoin et al. |
| 5,577,567 A | 11/1996 | Johnson et al. |
| 5,581,630 A | 12/1996 | Bonneau, Jr. |
| 5,584,025 A | 12/1996 | Keithley et al. |
| 5,590,062 A | 12/1996 | Nagamitsu et al. |
| 5,617,319 A | 4/1997 | Arakawa et al. |
| 5,630,103 A | 5/1997 | Smith et al. |
| 5,671,342 A * | 9/1997 | Millier et al. ............... 345/418 |
| 5,720,363 A | 2/1998 | Kipp |
| 5,751,245 A | 5/1998 | Janky et al. |
| 5,774,133 A | 6/1998 | Neave et al. |
| 5,794,207 A | 8/1998 | Walker et al. |
| 5,805,810 A | 9/1998 | Maxwell |
| 5,819,269 A | 10/1998 | Uomini |
| 5,826,244 A | 10/1998 | Huberman |
| 5,831,664 A | 11/1998 | Wharton et al. |
| 5,835,896 A | 11/1998 | Fisher et al. |
| 5,852,810 A | 12/1998 | Sotiroff et al. |
| 5,904,214 A | 5/1999 | Lin |
| 5,905,499 A | 5/1999 | McDowall et al. |
| 5,907,322 A | 5/1999 | Kelly et al. |
| 5,926,765 A | 7/1999 | Sasaki |
| 5,930,474 A | 7/1999 | Dunworth et al. |
| 5,937,413 A | 8/1999 | Hyun et al. |
| 5,940,806 A | 8/1999 | Danial |
| 5,991,737 A | 11/1999 | Chen |
| 6,024,288 A | 2/2000 | Gottlich et al. |
| 6,029,141 A | 2/2000 | Bezos et al. |
| 6,029,195 A | 2/2000 | Herz |
| 6,034,618 A | 3/2000 | Tatebayashi et al. |
| 6,036,601 A | 3/2000 | Heckel |
| 6,047,194 A | 4/2000 | Andersson |
| 6,047,236 A | 4/2000 | Hancock |
| 6,049,778 A | 4/2000 | Walker et al. |
| 6,059,263 A | 5/2000 | Otema et al. |
| 6,073,138 A | 6/2000 | de l'Etraz et al. |
| 6,078,906 A | 6/2000 | Huberman |
| 6,088,702 A | 7/2000 | Plantz et al. |
| 6,092,076 A | 7/2000 | McDonough et al. |
| 6,092,105 A | 7/2000 | Goldman |
| 6,101,484 A | 8/2000 | Halbert et al. |
| 6,108,639 A | 8/2000 | Walker et al. |
| 6,122,592 A | 9/2000 | Arakawa et al. |
| 6,134,486 A | 10/2000 | Kanayama |
| 6,148,260 A | 11/2000 | Musk et al. |
| 6,148,289 A | 11/2000 | Virdy |
| 6,175,831 B1 | 1/2001 | Weinreich et al. |
| 6,199,076 B1 | 3/2001 | Logan et al. |
| 6,229,533 B1 | 5/2001 | Farmer et al. |
| 6,236,990 B1 | 5/2001 | Geller et al. |
| 6,269,369 B1 | 7/2001 | Robertson |
| 6,308,177 B1 | 10/2001 | Israni et al. |
| 6,317,718 B1 | 11/2001 | Fano |
| 6,336,111 B1 | 1/2002 | Ashby et al. |
| 6,339,745 B1 | 1/2002 | Novik |
| 6,356,834 B2 | 3/2002 | Hancock et al. |
| 6,381,537 B1 | 4/2002 | Chenault et al. |
| 6,401,085 B1 | 6/2002 | Gershman et al. |
| 6,405,123 B1 | 6/2002 | Rennard et al. |
| 6,408,307 B1 | 6/2002 | Semple et al. |
| 6,445,983 B1 | 9/2002 | Dickson et al. |
| 6,453,339 B1 | 9/2002 | Schultz et al. |
| 6,470,268 B1 | 10/2002 | Ashcraft et al. |
| 6,480,885 B1 | 11/2002 | Olivier |
| 6,487,583 B1 | 11/2002 | Harvey et al. |
| 6,498,982 B2 | 12/2002 | Bellesfield et al. |
| 6,507,776 B1 | 1/2003 | Fox, III |
| 6,513,069 B1 | 1/2003 | Abato et al. |
| 6,519,629 B2 | 2/2003 | Harvey et al. |
| 6,532,007 B1 | 3/2003 | Matsuda |
| 6,542,813 B1 | 4/2003 | Kovacs |
| 6,542,817 B2 | 4/2003 | Miyaki |
| 6,542,936 B1 | 4/2003 | Mayle et al. |
| 6,557,013 B1 | 4/2003 | Ziff et al. |
| 6,587,787 B1 | 7/2003 | Yokota |
| 6,597,983 B2 | 7/2003 | Hancock |
| 6,600,418 B2 | 7/2003 | Francis et al. |
| 6,611,751 B2 | 8/2003 | Warren |
| 6,615,039 B1 | 9/2003 | Eldering |
| 6,622,086 B2 | 9/2003 | Polidi |
| 6,629,136 B1 | 9/2003 | Naidoo |
| 6,633,311 B1 | 10/2003 | Douvikas et al. |
| 6,636,803 B1 | 10/2003 | Hartz, Jr. et al. |
| 6,640,187 B1 | 10/2003 | Chenault et al. |
| 6,643,663 B1 | 11/2003 | Dabney et al. |
| 6,646,568 B2 | 11/2003 | MacPhail et al. |
| 6,647,383 B1 | 11/2003 | August et al. |
| 6,654,800 B1 | 11/2003 | Rieger, III |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,684,196 B1 | 1/2004 | Mini et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,907,405 B2 | 6/2005 | Brett |
| 6,918,576 B2 | 7/2005 | Finkbeiner |
| 6,926,233 B1 | 8/2005 | Corcoran, III |
| 6,931,419 B1 | 8/2005 | Lindquist |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B2 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,050,909 B2 | 5/2006 | Nichols et al. |
| 7,068,309 B2 | 6/2006 | Toyama et al. |
| 7,069,308 B2 | 6/2006 | Abrams |
| 7,072,849 B1 | 7/2006 | Filepp et al. |
| 7,076,409 B2 | 7/2006 | Agrawala et al. |
| 7,076,741 B2 | 7/2006 | Miyaki |
| 7,079,943 B2 | 7/2006 | Flann et al. |
| 7,080,019 B1 | 7/2006 | Hurzeler |
| 7,080,096 B1 | 7/2006 | Imamura |
| 7,085,650 B2 | 8/2006 | Anderson |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger, III |
| 7,155,336 B2 | 12/2006 | Dorfman et al. |
| 7,158,878 B2 | 1/2007 | Rasmussen et al. |
| 7,174,301 B2 | 2/2007 | Florance et al. |
| 7,177,872 B2 | 2/2007 | Schwesig et al. |
| 7,178,720 B1 | 2/2007 | Strubbe et al. |
| 7,184,990 B2 | 2/2007 | Walker et al. |

(56) References Cited

U.S. PATENT DOCUMENTS

| | | |
|---|---|---|
| 7,188,056 B2 | 3/2007 | Kagarlis |
| 7,188,080 B1 | 3/2007 | Walker et al. |
| 7,188,153 B2 | 3/2007 | Lunt et al. |
| 7,209,803 B2 | 4/2007 | Okamoto et al. |
| 7,218,993 B2 | 5/2007 | Yasukawa et al. |
| 7,228,232 B2 | 6/2007 | Bodin et al. |
| 7,233,942 B2 | 6/2007 | Nye |
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 * | 4/2008 | Rohlf et al. .................. 702/5 |
| 7,353,199 B1 | 4/2008 | DiStefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,702,545 B1 | 4/2010 | Compton et al. |
| 7,725,492 B2 | 5/2010 | Sittig et al. |
| 7,734,254 B2 | 6/2010 | Frost et al. |
| 7,751,971 B2 | 7/2010 | Chang et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 * | 9/2010 | Stewart .................. 455/518 |
| 7,802,290 B1 | 9/2010 | Bansal et al. |
| 7,808,378 B2 | 10/2010 | Hayden |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 * | 11/2010 | Karam .................. 715/753 |
| 7,840,224 B2 * | 11/2010 | Vengroff et al. .......... 455/456.1 |
| 7,840,319 B2 | 11/2010 | Zhong |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,703 B1 | 8/2011 | Watkins |
| 7,996,109 B2 | 8/2011 | Zini et al. |
| 7,996,270 B2 | 8/2011 | Sundaresan |
| 8,010,230 B2 | 8/2011 | Zini et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,095,430 B2 | 1/2012 | Abhyanker |
| 8,103,734 B2 | 1/2012 | Galli et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,661 B1 | 3/2012 | Billman et al. |
| 8,145,703 B2 | 3/2012 | Frishert et al. |
| 8,149,113 B2 | 4/2012 | Diem |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 | 6/2012 | Zini et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,296,373 B2 | 10/2012 | Bosworth et al. |
| 8,315,389 B2 | 11/2012 | Qiu et al. |
| 8,326,091 B1 | 12/2012 | Jing et al. |
| 8,326,315 B2 | 12/2012 | Phillips et al. |
| 8,352,183 B2 | 1/2013 | Thota et al. |
| 8,364,757 B2 | 1/2013 | Scott et al. |

(56) References Cited

U.S. PATENT DOCUMENTS

| | | |
|---|---|---|
| 8,380,638 B1 | 2/2013 | Watkins |
| 8,391,909 B2 | 3/2013 | Stewart |
| 8,402,372 B2 | 3/2013 | Gillespie et al. |
| 8,412,576 B2 | 4/2013 | Urbanski |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker |
| 8,433,650 B1 | 4/2013 | Thomas |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Vilella et al. |
| 8,504,284 B2 | 8/2013 | Brülle-Drews et al. |
| 8,504,512 B2 | 8/2013 | Herzog et al. |
| 8,510,268 B1 | 8/2013 | Laforge et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,627,506 B2 | 1/2014 | Vera et al. |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,897 B2 | 2/2014 | Abhyanker |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,605 B1 | 4/2014 | Burrell et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Gueziec |
| 8,723,679 B2 | 5/2014 | Whisenant |
| 8,732,091 B1 | 5/2014 | Abhyanker |
| 8,732,155 B2 | 5/2014 | Vegnaduzzo et al. |
| 8,732,219 B1 | 5/2014 | Ferries et al. |
| 8,738,545 B2 | 5/2014 | Abhyanker |
| 8,832,556 B2 | 9/2014 | Steinberg |
| 2001/0005829 A1 | 6/2001 | Raveis |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1* | 5/2002 | Twig et al. ............ 705/7 |
| 2002/0065739 A1 | 5/2002 | Florance et al. |
| 2002/0070967 A1* | 6/2002 | Tanner et al. ........ 345/764 |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1* | 1/2003 | Kraft et al. .............. 705/14 |
| 2003/0023489 A1 | 1/2003 | McGuire et al. |
| 2003/0023586 A1 | 1/2003 | Knorr |
| 2003/0033176 A1 | 2/2003 | Hancock |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1* | 10/2003 | Bell et al. .............. 707/1 |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0002871 A1 | 1/2004 | Geranio |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0039581 A1 | 2/2004 | Wheeler |
| 2004/0054428 A1 | 3/2004 | Sheha et al. |
| 2004/0056762 A1 | 3/2004 | Rogers |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |

(56) References Cited

U.S. PATENT DOCUMENTS

| | | |
|---|---|---|
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1* | 11/2004 | Samadani et al. ........ 340/995.14 |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1* | 2/2005 | Riegelman et al. ............ 715/714 |
| 2005/0044061 A1 | 2/2005 | Klemow |
| 2005/0049971 A1* | 3/2005 | Bettinger ........................ 705/51 |
| 2005/0055353 A1* | 3/2005 | Marx et al. ...................... 707/10 |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1* | 9/2005 | Smith ................................ 702/3 |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino et al. |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1* | 11/2005 | Kreft ............................... 701/207 |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1* | 12/2005 | Eraker et al. ...................... 705/1 |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058921 A1 | 3/2006 | Okamoto |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell |
| 2006/0125616 A1 | 6/2006 | Song |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1* | 9/2006 | Arutunian et al. ............... 705/14 |
| 2006/0212407 A1 | 9/2006 | Lyon |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1* | 10/2006 | Haney ........................... 455/420 |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1* | 10/2006 | Kimchi et al. ............. 340/995.1 |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |

(56) References Cited

U.S. PATENT DOCUMENTS

| | | | |
|---|---|---|---|
| 2006/0294011 A1 | 12/2006 | Smith | |
| 2007/0002057 A1 | 1/2007 | Danzig et al. | |
| 2007/0003182 A1 | 1/2007 | Hunn | |
| 2007/0005683 A1 | 1/2007 | Omidyar | |
| 2007/0005750 A1 | 1/2007 | Lunt et al. | |
| 2007/0011148 A1 | 1/2007 | Burkey et al. | |
| 2007/0011617 A1 | 1/2007 | Akagawa et al. | |
| 2007/0016689 A1 | 1/2007 | Birch | |
| 2007/0027920 A1 | 2/2007 | Alvarado et al. | |
| 2007/0032942 A1 | 2/2007 | Thota | |
| 2007/0033064 A1 | 2/2007 | Abrahamsohn | |
| 2007/0033182 A1* | 2/2007 | Knorr | 707/5 |
| 2007/0038646 A1 | 2/2007 | Thota | |
| 2007/0043947 A1 | 2/2007 | Mizikovsky et al. | |
| 2007/0050360 A1 | 3/2007 | Hull et al. | |
| 2007/0061128 A1 | 3/2007 | Odom et al. | |
| 2007/0061405 A1 | 3/2007 | Keohane et al. | |
| 2007/0067219 A1 | 3/2007 | Altberg et al. | |
| 2007/0078747 A1 | 4/2007 | Baack | |
| 2007/0078772 A1 | 4/2007 | Dadd | |
| 2007/0099609 A1 | 5/2007 | Cai | |
| 2007/0105536 A1 | 5/2007 | Tingo | |
| 2007/0106627 A1 | 5/2007 | Srivastava et al. | |
| 2007/0112461 A1 | 5/2007 | Zini et al. | |
| 2007/0112645 A1 | 5/2007 | Traynor et al. | |
| 2007/0112729 A1 | 5/2007 | Wiseman et al. | |
| 2007/0118430 A1 | 5/2007 | Wiseman et al. | |
| 2007/0118525 A1 | 5/2007 | Svendsen | |
| 2007/0150603 A1 | 6/2007 | Crull et al. | |
| 2007/0156429 A1 | 7/2007 | Godar | |
| 2007/0159651 A1 | 7/2007 | Disario et al. | |
| 2007/0162432 A1 | 7/2007 | Armstrong et al. | |
| 2007/0162458 A1 | 7/2007 | Fasciano | |
| 2007/0162547 A1 | 7/2007 | Ross | |
| 2007/0162942 A1 | 7/2007 | Hamynen et al. | |
| 2007/0167204 A1 | 7/2007 | Lyle et al. | |
| 2007/0168852 A1 | 7/2007 | Erol et al. | |
| 2007/0168888 A1 | 7/2007 | Jawerth | |
| 2007/0174389 A1 | 7/2007 | Armstrong et al. | |
| 2007/0179905 A1 | 8/2007 | Buch et al. | |
| 2007/0185906 A1 | 8/2007 | Humphries et al. | |
| 2007/0192299 A1 | 8/2007 | Zuckerberg et al. | |
| 2007/0203644 A1* | 8/2007 | Thota et al. | 701/211 |
| 2007/0203820 A1 | 8/2007 | Rashid | |
| 2007/0207755 A1 | 9/2007 | Julia et al. | |
| 2007/0208613 A1 | 9/2007 | Backer | |
| 2007/0208802 A1 | 9/2007 | Barman et al. | |
| 2007/0208916 A1 | 9/2007 | Tomita | |
| 2007/0214141 A1 | 9/2007 | Sittig et al. | |
| 2007/0218900 A1 | 9/2007 | Abhyanker | |
| 2007/0219659 A1 | 9/2007 | Abhyanker et al. | |
| 2007/0219712 A1 | 9/2007 | Abhyanker | |
| 2007/0220174 A1 | 9/2007 | Abhyanker | |
| 2007/0226314 A1 | 9/2007 | Eick et al. | |
| 2007/0233291 A1 | 10/2007 | Herde et al. | |
| 2007/0233367 A1* | 10/2007 | Chen et al. | 701/207 |
| 2007/0233375 A1 | 10/2007 | Garg et al. | |
| 2007/0233582 A1 | 10/2007 | Abhyanker | |
| 2007/0239352 A1 | 10/2007 | Thota et al. | |
| 2007/0239552 A1 | 10/2007 | Sundaresan | |
| 2007/0239648 A1 | 10/2007 | Thota | |
| 2007/0245002 A1 | 10/2007 | Nguyen et al. | |
| 2007/0250321 A1 | 10/2007 | Balusu | |
| 2007/0250511 A1 | 10/2007 | Endler et al. | |
| 2007/0255785 A1 | 11/2007 | Hayashi et al. | |
| 2007/0255831 A1 | 11/2007 | Hayashi et al. | |
| 2007/0258642 A1 | 11/2007 | Thota | |
| 2007/0260599 A1 | 11/2007 | McGuire et al. | |
| 2007/0261071 A1 | 11/2007 | Lunt et al. | |
| 2007/0266003 A1 | 11/2007 | Wong et al. | |
| 2007/0266097 A1* | 11/2007 | Harik et al. | 709/204 |
| 2007/0266118 A1 | 11/2007 | Wilkins | |
| 2007/0268310 A1 | 11/2007 | Dolph et al. | |
| 2007/0270163 A1 | 11/2007 | Anupam et al. | |
| 2007/0271367 A1* | 11/2007 | Yardeni et al. | 709/223 |
| 2007/0273558 A1 | 11/2007 | Smith et al. | |
| 2007/0281689 A1* | 12/2007 | Altman et al. | 455/435.1 |
| 2007/0281690 A1* | 12/2007 | Altman et al. | 455/435.1 |
| 2007/0281716 A1* | 12/2007 | Altman et al. | 455/466 |
| 2007/0282621 A1* | 12/2007 | Altman et al. | 705/1 |
| 2007/0282987 A1 | 12/2007 | Fischer et al. | |
| 2007/0288164 A1 | 12/2007 | Gordon et al. | |
| 2007/0288311 A1 | 12/2007 | Underhill | |
| 2007/0288621 A1 | 12/2007 | Gundu et al. | |
| 2007/0294357 A1 | 12/2007 | Antoine | |
| 2008/0005076 A1 | 1/2008 | Payne et al. | |
| 2008/0005231 A1 | 1/2008 | Kelley et al. | |
| 2008/0010343 A1 | 1/2008 | Escaffi et al. | |
| 2008/0010365 A1 | 1/2008 | Schneider | |
| 2008/0016051 A1 | 1/2008 | Schiller | |
| 2008/0020814 A1 | 1/2008 | Kernene | |
| 2008/0032666 A1* | 2/2008 | Hughes et al. | 455/404.1 |
| 2008/0032703 A1* | 2/2008 | Krumm et al. | 455/456.1 |
| 2008/0033641 A1* | 2/2008 | Medalia | 701/209 |
| 2008/0033652 A1* | 2/2008 | Hensley et al. | 702/5 |
| 2008/0033739 A1 | 2/2008 | Zuckerberg et al. | |
| 2008/0033776 A1 | 2/2008 | Marchese | |
| 2008/0040370 A1 | 2/2008 | Bosworth et al. | |
| 2008/0040428 A1 | 2/2008 | Wei et al. | |
| 2008/0040474 A1 | 2/2008 | Zuckerberg et al. | |
| 2008/0040475 A1 | 2/2008 | Bosworth et al. | |
| 2008/0040673 A1 | 2/2008 | Zuckerberg et al. | |
| 2008/0043020 A1 | 2/2008 | Snow et al. | |
| 2008/0043037 A1 | 2/2008 | Carroll | |
| 2008/0046976 A1 | 2/2008 | Zuckerberg | |
| 2008/0048065 A1 | 2/2008 | Kuntz | |
| 2008/0051932 A1 | 2/2008 | Jermyn et al. | |
| 2008/0059992 A1 | 3/2008 | Amidon et al. | |
| 2008/0065321 A1* | 3/2008 | Dacosta | 701/208 |
| 2008/0065611 A1 | 3/2008 | Hepworth et al. | |
| 2008/0070593 A1 | 3/2008 | Altman et al. | |
| 2008/0070697 A1 | 3/2008 | Robinson et al. | |
| 2008/0071929 A1 | 3/2008 | Motte et al. | |
| 2008/0077464 A1 | 3/2008 | Gottlieb et al. | |
| 2008/0077581 A1 | 3/2008 | Drayer et al. | |
| 2008/0077642 A1 | 3/2008 | Carbone et al. | |
| 2008/0077708 A1 | 3/2008 | Scott et al. | |
| 2008/0086368 A1 | 4/2008 | Bauman et al. | |
| 2008/0086458 A1 | 4/2008 | Robinson et al. | |
| 2008/0091461 A1 | 4/2008 | Evans et al. | |
| 2008/0091723 A1* | 4/2008 | Zuckerberg et al. | 707/104.1 |
| 2008/0091786 A1 | 4/2008 | Jhanji | |
| 2008/0097999 A1* | 4/2008 | Horan | 707/10 |
| 2008/0098090 A1* | 4/2008 | Geraci et al. | 709/219 |
| 2008/0098313 A1 | 4/2008 | Pollack | |
| 2008/0103959 A1 | 5/2008 | Carroll et al. | |
| 2008/0104227 A1 | 5/2008 | Birnie et al. | |
| 2008/0109718 A1 | 5/2008 | Narayanaswami | 715/262 |
| 2008/0115082 A1 | 5/2008 | Simmons et al. | |
| 2008/0115226 A1 | 5/2008 | Welingkar et al. | |
| 2008/0117928 A1 | 5/2008 | Abhyanker | |
| 2008/0125969 A1* | 5/2008 | Chen et al. | 701/211 |
| 2008/0126355 A1 | 5/2008 | Rowley | |
| 2008/0126411 A1 | 5/2008 | Zhuang et al. | |
| 2008/0126476 A1 | 5/2008 | Nicholas et al. | |
| 2008/0126478 A1 | 5/2008 | Ferguson et al. | |
| 2008/0133495 A1 | 6/2008 | Fischer | |
| 2008/0133649 A1 | 6/2008 | Pennington | |
| 2008/0134035 A1 | 6/2008 | Pennington et al. | |
| 2008/0148156 A1 | 6/2008 | Brewer et al. | |
| 2008/0154733 A1 | 6/2008 | Wolfe | |
| 2008/0155019 A1 | 6/2008 | Wallace et al. | |
| 2008/0162027 A1 | 7/2008 | Murphy et al. | |
| 2008/0162211 A1* | 7/2008 | Addington | 705/7 |
| 2008/0162260 A1 | 7/2008 | Rohan et al. | |
| 2008/0167771 A1 | 7/2008 | Whittaker et al. | |
| 2008/0168068 A1* | 7/2008 | Hutheesing | 707/10 |
| 2008/0168175 A1 | 7/2008 | Tran | |
| 2008/0172173 A1 | 7/2008 | Chang et al. | |
| 2008/0172244 A1* | 7/2008 | Coupal et al. | 705/1 |
| 2008/0172288 A1* | 7/2008 | Pilskalns et al. | 705/10 |
| 2008/0189292 A1 | 8/2008 | Stremel et al. | |
| 2008/0189380 A1 | 8/2008 | Bosworth et al. | |
| 2008/0189768 A1 | 8/2008 | Callahan et al. | |

(56) References Cited

U.S. PATENT DOCUMENTS

| | | |
|---|---|---|
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0228719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243378 A1 | 10/2008 | Zavoli |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1* | 12/2008 | Mitnick et al. ............ 709/205 |
| 2008/0307066 A1 | 12/2008 | Amidon et al. |
| 2008/0307320 A1 | 12/2008 | Payne et al. |
| 2008/0316021 A1* | 12/2008 | Manz et al. ............ 340/539.13 |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1* | 1/2009 | Elliott et al. ............ 707/104.1 |
| 2009/0007195 A1 | 1/2009 | Beyabani |
| 2009/0018850 A1 | 1/2009 | Abhyanker |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1* | 1/2009 | Manz ............ 455/404.2 |
| 2009/0031301 A1 | 1/2009 | D'Angelo et al. |
| 2009/0043650 A1 | 2/2009 | Abhyanker et al. |
| 2009/0048922 A1 | 2/2009 | Morgenstern et al. |
| 2009/0049018 A1 | 2/2009 | Gross |
| 2009/0049037 A1 | 2/2009 | Gross |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0064011 A1 | 3/2009 | Abhyanker |
| 2009/0064144 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0282353 A1 | 11/2009 | Halbherr et al. |
| 2009/0284530 A1 | 11/2009 | Lester et al. |
| 2009/0287682 A1 | 11/2009 | Fujioka et al. |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0057555 A1 | 3/2010 | Butterfield et al. |
| 2010/0070075 A1 | 3/2010 | Chirnomas |
| 2010/0077316 A1 | 3/2010 | Omansky et al. |
| 2010/0082683 A1 | 4/2010 | Law et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0118025 A1* | 5/2010 | Smith et al. ............ 345/418 |
| 2010/0120422 A1 | 5/2010 | Cheung et al. |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1* | 8/2010 | Eraker et al. ............ 705/14.49 |
| 2010/0214250 A1 | 8/2010 | Gillespie et al. |
| 2010/0231383 A1 | 9/2010 | Levine et al. |
| 2010/0275033 A1 | 10/2010 | Gillespie et al. |
| 2010/0306016 A1 | 12/2010 | Solaro et al. |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1 | 7/2011 | Zini et al. |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Gueziec |
| 2012/0126974 A1 | 5/2012 | Phillips et al. |
| 2012/0163206 A1 | 6/2012 | Leung et al. |
| 2012/0166935 A1 | 6/2012 | Abhyanker |
| 2012/0191606 A1 | 7/2012 | Milne |
| 2012/0191797 A1 | 7/2012 | Masonis et al. |
| 2012/0209775 A1 | 8/2012 | Milne |
| 2012/0221470 A1 | 8/2012 | Lyon |
| 2012/0246024 A1 | 9/2012 | Thomas et al. |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0331002 A1 | 12/2012 | Carrington |
| 2013/0005307 A1 | 1/2013 | Kim et al. |
| 2013/0024108 A1 | 1/2013 | Grun |
| 2013/0041862 A1 | 2/2013 | Yang et al. |
| 2013/0054317 A1 | 2/2013 | Abhyanker |

(56) References Cited

U.S. PATENT DOCUMENTS

| | | |
|---|---|---|
| 2013/0055163 A1 | 2/2013 | Matas et al. |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0080217 A1 | 3/2013 | Abhyanker |
| 2013/0110631 A1 | 5/2013 | Mitchell et al. |
| 2013/0151455 A1 | 6/2013 | Odom et al. |
| 2013/0159127 A1 | 6/2013 | Myslinski |
| 2013/0204437 A1 | 8/2013 | Koselka et al. |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Vilella et al. |
| 2013/0303197 A1 | 11/2013 | Chandra et al. |
| 2013/0317999 A1 | 11/2013 | Zimberoff et al. |
| 2014/0040179 A1 | 2/2014 | Herzog et al. |
| 2014/0067704 A1 | 3/2014 | Abhyanker |
| 2014/0074736 A1 | 3/2014 | Carrington |
| 2014/0081450 A1 | 3/2014 | Kuehnrich et al. |
| 2014/0087780 A1 | 3/2014 | Abhyanker et al. |
| 2014/0095293 A1 | 4/2014 | Abhyanker |
| 2014/0100900 A1 | 4/2014 | Abhyanker |
| 2014/0108540 A1 | 4/2014 | Crawford |
| 2014/0108556 A1 | 4/2014 | Abhyanker |
| 2014/0108613 A1 | 4/2014 | Randall |
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1 | 6/2014 | Abhyanker et al. |

FOREIGN PATENT DOCUMENTS

| | | |
|---|---|---|
| WO | 9956143 A1 | 11/1999 |
| WO | 0054170 A2 | 9/2000 |
| WO | 0163423 A1 | 8/2001 |
| WO | 0201455 A2 | 1/2002 |
| WO | 0219236 A1 | 3/2002 |
| WO | 0241115 A2 | 5/2002 |
| WO | 03058540 A1 | 7/2003 |
| WO | 2005103624 A2 | 11/2005 |
| WO | 2006020471 A1 | 2/2006 |
| WO | 2007108927 A2 | 9/2007 |
| WO | 2007108928 A2 | 9/2007 |
| WO | 2007113844 A1 | 10/2007 |
| WO | 2008103149 A1 | 8/2008 |
| WO | 2008123851 A1 | 10/2008 |
| WO | 2009138559 A1 | 11/2009 |
| WO | 2013188762 A1 | 12/2013 |

OTHER PUBLICATIONS

Jones et a., People-To-People-To-Geographic-Places: The P3 Framework for Location Based Community Systems, p. 249-282 (Computer Supported Cooperative Work vol. 13, Kluwer Academic Publishers, 2004).*

Mehler et al., Spatial Analysis of News Sources, p. 765-771 (IEEE Transactions on Visualization and Computer Graphics, vol. 12, No. 5, IEEE, Sept./Oct. 2006).*

Xomba: National and local news, http://www.xomba.com/overview, Sep. 4, 2007, pp. 1 and 2.

Marlow C., Getting the Scoop: Social Networks for News Dissemination, http://alumni.media.mit.edu/~cameron/cv/pubs/02-01.html, Sunbelt Social Network Conference XXII, Feb. 2003, p. 1.

Screenshot of sidecar website, Aug. 27, 2014 (p. 1) http://sidecar.com/.

Screenshot of patch media website, Aug. 27, 2014 (pp. 6) http://www.patch.com/.

Screenshot of i-neighbors website, Aug. 27, 2014 (pp. 3) https://www.i-neighbors.org/howitworks.php.

"Friends and Neighbors on the Web", 2001 by Lada A. Adamic et al. (pp. 9) http://www.hpl.hp.com/research/idl/papers/web10/fnn2.pdf "A social influence model of consumer participation in network- and small-group-based virtual communities", International Journal of Research in Marketing, 2004 by Utpal M, Dholakia et al. (pp. 23) http://www.bcf.usc.edu/~douglast/620/bettina1.pdf.

"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062

"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.

"Notification for Shared Annotation of Digital Documents", Technical Report MSR—TR-2001-87, Sep. 19, 2001 by A. J. Bernheim Brush et al. (pp. 9) http://research.microsoft.com/pubs/69880/tr-2001-87.pdf.

"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.

"Computer Systems and the Design of Organizational Interaction", Apr. 1988, by Fernando Flores et al. (pp. 20) http://cpe.njitedu/dInotes/CIS/CIS735/ComputerSystemsandDesign.pdf.

Screenshot of My Neighbourhoods on CrunchBase, Aug. 27, 2014 (pp. 2) http://www.crunchbase.com/organization/my-neighbourhoods.

Screenshot of Dehood website, Aug. 27, 2014, (p. 1) http://www.dehood.com/home.

Wikipedia entry The Freecycle Network website—Aug. 27, 2014 (pp. 3) http://en.wikipedia.org/wiki/The_Freecycle_Network.

Wikipedia entry Meetup website—Aug. 27, 2014 (p. 1) http://en.wikipedia.org/wiki/Meetup_(website).

Wikipedia entry Google Maps website_Aug. 27, 2014 (p. 18) http://en.wikipedia.org/wiki/Google_Maps.

Screenshot of Facebook website for groups, Aug. 27, 2014, (p. 1) https://www.facebook.com/about/groups.

Screenshot of Uber website, Aug. 27, 2014, (pp. 5) https://www.uber.com/.

Screenshot of Lyft website, Aug. 27, 2014, (pp. 5) https://www.lyft.com/.

Wikipedia entry Google driverless car—Aug. 27, 2014 (pp. 4) http://en.wikipedia.org/wiki/Google_driverless_car.

Wikipedia entry Uber (company)—Aug. 27, 2014 (pp. 7) http://en.wikipedia.org/wiki/Uber_(company).

Wikipedia entry Autonomous car—Aug. 27, 2014 (pp. 15) http://en.wikipedia.org/wiki/Autonomous_car.

"Perspective: Social networking for all?", ZDNet, Sep. 6, 2006 by Paul Lamb (p. 1) http://www.zdnet.com/news/perspective-social-networking-for-all/149441.

"Screenshot of REMAX Advance Search web page" (pp. 2) http://www.remax.com/advancedsearch/.

"Screenshot of REMAX Advance Listing Search web page" (pp. 2) http://global.remax.com/AdvancedListingSearch.aspx.

"Screenshot of MAGICBRICKS Post Requirement web page" (pp. 2) http://www.magicbricks.com/property-requirement-to-buy-rent/residential-commercial.

"Screenshot of MAP MY INDIA Vehicle Tracking web page" (pp. 2) http://www.mapmyindia.com/solutions/tracking-lbs/vehicle-tracking.

"Screenshot of MAP MY INDIA Asset Tracking web page" (pp. 2) http://www.mapmyindia.com/solutions/tracking-lbs/asset-tracking.

"Screenshot of MAP MY INDIA Geo Tagging web page" (p. 1) http://www.mapmyindia.com/solutions/enterprises/geo-tagging.

"Screenshot of homepage of ZILLOW website" (pp. 10) http://www.zillow.com/.

"Screenshot of ZILLOW Rental Listings web page" (p. 9) http://www.zillow.com/homes/for_rent/.

(56) References Cited

OTHER PUBLICATIONS

"Screenshot of ZILLOW Real Estate & Homes for Sale web page" (Pages 5) http://www.zillow.com/homes/for_sale/days_sort/53.409532,-64.072266,19.352611,-129.550781_rect/3_zm/.

"Screenshot of TRULIA Home prices web page" (pp. 3) http://www.trulia.com/home_prices/.

"Screenshot of TRULIA New York Apartment Communities for rent web page" (pp. 4) http://www.trulia.com/for_rent/New_York,NY.

"Screenshot of REALTOR Rental Properties web page" (pp. 2) http://www.realtor.com/rentals.

"Screenshot of REALTOR Homes for Sale web page" (pp. 3) http://www.realtor.com/realestateforsale.

"Screenshot of homepage of HOUSEHUNT website" (pp. 2) http://www.househunt.com/.

"Screenshot of COLDWELL BANKER Real Estate Search web page" (pp. 2) http://www.coldwellbanker.com/real_estate_search;jsessionid=S8ok3kaZtBh5GKHoo-Yzo28Z.sky-node04.

"Screenshot of homepage of SWITCHBOARD website" (p. 1) http://www.switchboard.com/.

"Screenshot of ANYWHO Whitepages web page" (pp. 2) http://www.anywho.com/whitepages.

"Screenshot of homepage of SUPERPAGES website" (pp. 2) http://wp.superpages.com/.

"Screenshot of homepage of WHITEPAGES website" (p. 1) http://www.whitepages.com/.

"How to search a Social Network", HP Labs, 1501 Page Mill Road, Palo Alto, CA, Jan. 8, 2005 by Lada Adamic et al. (pp. 20) http://www-personal.umich.edu/~ladamic/papers/socialsearch/adamicsocialsearch.pdf.

"Geographic Routing in Social Networks", David Liben-Nowell Carleton College, Dec. 6, 2005 by Ravi Kumar at al. (pp. 14) http://cs.wellesley.edu/~cs315/315_PPTs/L19-SocialNetworks/Stuff/wellesley.pdf.

"People-To-People-to-Geographical-Places: The P3 Framework for Location-Based Community Systems", by Quentin Jones et al. (pp. 26) http://citeseerx.ist.psu.edu/viewdoc/downlaod?doi=10.1.198.5230&rep=rep1&type=pdf.

"Spatial Analysis of News Sources", IEEE Transactions on Visualization and Computer Graphics, vol. 12, No. 5, On Sep. 2006 by Andrew Mehler et al. (pp. 7) http://www.ece.Isu.edu/xinli/Research/HeatMap_TVCG06.pdf.

"Screenshot of homepage of USA-PEOPLE-SEARCH website" (p. 2) http://www.usa-people-search.com/.

"Screenshot of homepage of I-NEIGHBORS website" (p. 1) https://www.i-neighbors.org/.

Fatdoor CEO Talks About Balancing Security with Community, Wired Magazine, May 31, 2007, by Terrence Russell (2 Pages.) http://www.wired.com/2007/05/fatdoor_ceo_tal/.

Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.

Fatdoor Launches Social Network for Your Neighborhood, Mashable Article, May 28, 2007, by Kristen Nicole (3 pp.) http://mashable.com/2007/05/28/fatdoor.

Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.

Frontporchforum. screenshots. Jul. 19, 2006 webarchive.org 1-15 (herein FrontPorch) (pp. 15).

Fatdoor where 2.0 Launch Coverage Report, Jun. 21, 2007, by Sterling Communications (pp. 24).

Screenshot of Fatdoor on Wikipedia, Apr. 12, 2007 (p. 1).

Screenshot of Fatdoor website with its features—Aug. 21, 2014 (pp. 6) http://www.fatdoor.com/.

Screenshot of AirBnB website with its features—Aug. 21, 2014 (pp. 4) http://www.airbnb.com/.

Wikipedia entry AirBnB website—Aug. 21, 2014 (pp. 16) http://en.wikipedia.org/wiki/Airbnb.

Screenshot of Meetey on Crunch Base, Aug. 27, 2014, (pp. 3) http://www.crunchbase.com/organization/meetey.

Wikipedia entry Patch Media website—Aug. 27, 2014 (pp. 2) http://en.wikipedia.org/wiki/Patch_Media.

Wikipedia entry Yahoo! Groups website—Aug. 27, 2014 (pp. 7) http://en.wikipedia.org/wiki/Yahoo_groups.

\* cited by examiner

| USER 500 | PROXIMITY 502 | PRINCIPAL ADDRESS 504 | E-MAIL 506 | PUBLICATION TYPE 508 | INSTANT MESSAGE 510 | CONTACT NUMBER 512 |
|---|---|---|---|---|---|---|
| JOHN SMITH | SAME STREET | 222 TULANE RD. | J.SMITH@MOO.COM | VIDEO CLIP | N/A | N/A |
| BILL HARRIS | 1 MILE | 643 SUNRISE DR. | BILLTHEKID@ASH.COM | BANTER | BILL HARRIS | 926-743-8527 |
| VICTOR DRAZEN | NEXT DOOR | 386 TULANE RD. | 24DRAZEN@FOXX.COM | BANTER | VD24 | 926-743-1126 |
| CHLOE O'HARE | ¼ MILE | 99 HAMI AVE. | SIRROM@CTU.EDU | AUDIO | N/A | N/A |
| STEVE LOWRY | ½ MILE | 64 CANYON CT. | STEVE@CBA.COM | PHOTO | N/A | N/A |
| ••• | ••• | ••• | ••• | ••• | ••• | ••• |

FIGURE 5

HOT NEWS NEIGHBORHOOD BANTER IN A GEO-SPATIAL SOCIAL NETWORK

FIELD OF TECHNOLOGY

This disclosure relates generally to the technical fields of communications and, in one example embodiment, to a method and system of hot news neighborhood banter in a geo-spatial social network.

BACKGROUND

A news story may be any information (e.g., discovery of a new element in periodic table, development in an important Supreme Court case, final score of Super Bowl, etc.) and/or current events (e.g., War in Iraq, March Madness, presidential elections, etc.). The news story may often be reported by a variety of sources (e.g., newspapers, television, radio programs, wire service, websites, etc.). A news reporter may investigate the news story and/or may try to cover at least one side of an issue.

The news reporter may contact a person close to the news story (e.g., eye witness, neighbor, etc.) to obtain information (e.g., eye-witness account, photos, videos, audio files, etc.) relevant to the news story. The news reporter may perceive the information differently than the person contacted and/or choose not to use it in the news story.

An interested party in the news story may want more information about the news story. The person close to the news story (e.g., a neighbor) may have information (e.g., comments, personal thoughts, video clips, etc.) regarding the news story, but may not be able to share this information with the interested party. The person may submit the information through internet and/or network technologies (e.g., web logs, chat rooms, message boards, etc.). However, the interested party may not be able to easily find this submitted information.

The news reporter (e.g., journalist, radio broadcaster, television anchorman, etc.) may not know whom to interview to obtain information relevant to the news story. The news reporter may be far from the location of the news story and/or may be unable to reach the location fast enough (e.g., traffic blocking the road, the location is too far away, the area is blocked off, etc. Hence, the news reporter may not be able to contact people close to the news story (e.g., neighbors, eye witnesses, etc.)

SUMMARY

A method and system of hot news neighborhood banter in a geo-spatial social network are disclosed. In one aspect, a method includes identifying a hot news story, associating the hot news story with a specific geographic location, generating a map concurrently displaying a headline of the hot news story and the specific geographic location, and simultaneously generating in the map, profiles associated with a number of users surrounding the specific geographic location associated with the hot news story.

The method may further include processing a submission form, having an audio file, a video file, a photo, and/or a comment, associated with the hot news story, of a neighboring user located a threshold distance away from the specific geographic location of the hot news story. The method may also include enabling an interested user to access any number of user-generated contents of the submission forms associated with the hot news story, and submitting a comment from the user, relating to the user-generated contents of the submission form.

The method may yet include generating contact information of the neighboring user, located a threshold distance away from the specific geographic location of the hot news story. In addition, the method may include allowing the neighboring user for an immediate communication through a geo-spatial social network. The method may further include compensating the neighboring user with a consideration, for the immediate communication regarding the hot news story, and allocating a percentage of the consideration to the geo-spatial social network.

The method may also include locking the user-generated contents of the submission form of the neighboring user, charging the interested user a consideration for the access to the user-generated contents of the submission form of the neighboring user, compensating the neighboring user with the consideration, and allocating a percentage of the consideration to the geo-spatial social network.

The method may further include marketing the user-generated contents of the submission form of the neighboring user for sale, compensating the neighboring user with a consideration, and allocating a percentage of the consideration to the geo-spatial social network. The method may yet include evaluating the user-generated contents of the submission form in response to a request of a moderator, prior to locking the user-generated contents.

In addition, the method may include generating a classified view of purchasable items when the neighboring user markets goods associated with the hot news story. The method may also include notifying the users that the submission form associated with the hot news story has been submitted. The method may further include syndicating the user-generated contents of the submission form in a published media.

In another aspect, a method includes associating a current event with a specific geographic location, and creating a group consisting of a number of neighboring users surrounding the specific geographic location of the current event, in a geo-spatial social network. The method may further include generating a chat room such that the neighboring users in the group may communicate with each other. The method may also include enabling an interested party (e.g., may compensate the geo-spatial social network for access to a contact information of the group) to contact the group regarding the current event.

In yet another aspect, a system includes a news provider module to determine a hot news story associated with a specific geographic location and the specific geographic location, a hot news module to display the hot news story associated with the geographic location on a map, and a geo-spatial environment to process user-generated content associated with the hot news story. The system may further include a submission module to compile the user-generated content associated with the hot news story from a number of neighboring users surrounding the specific geographic location of the hot news story.

The system may also include a communication module to process correspondences between the neighboring users and other users regarding the hot news story. In addition, the system may include a finance module to allocate and/or distribute compensation from an interested user for access to the user-generated content associated with the hot new story and/or an immediate communication with the neighboring users.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 is a table view of user contact details, according to one embodiment.

Figure 1:
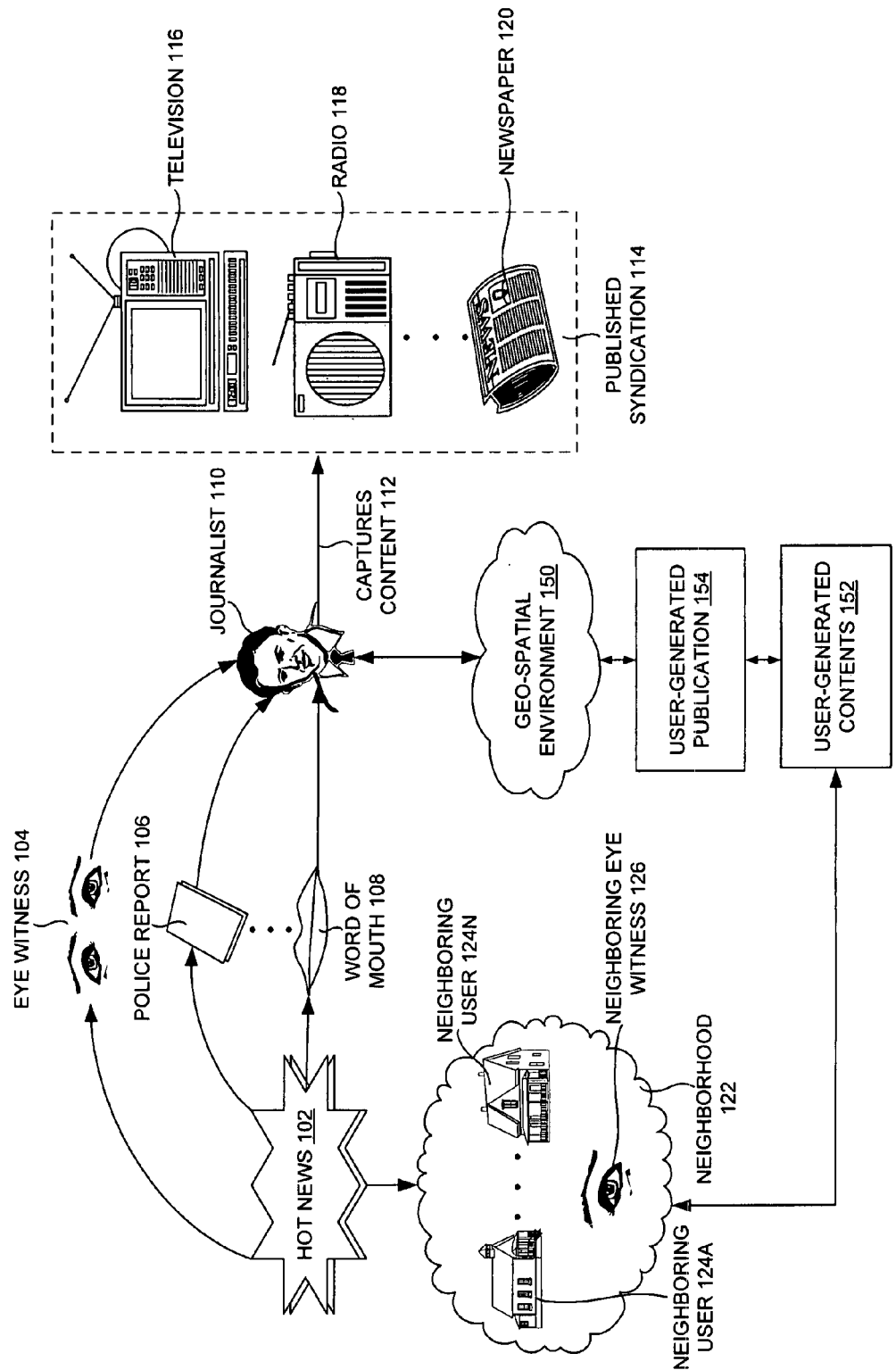
FIG. 1 is a process view of a hot news story published through a number of methods, according to one embodiment.

Other features of the present embodiments will be apparent from the accompanying drawings and from the description that follows.

DETAILED DESCRIPTION

A method and system of hot news neighborhood banter in a geo-spatial social network are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes identifying (e.g., using the news provider module 206 FIG. 2) a hot news story, (e.g., the hot news 102 of FIG. 1) associating the hot news story 102 with a specific geographic location (e.g., the hot news location 222 of FIG. 2), generating a map concurrently displaying (e.g., using the hot news module 208 of FIG. 2) a headline of the hot news story 102 and the specific geographic location 222, and simultaneously generating in the map, profiles associated with users (e.g., the neighboring users 228A-N of FIG. 2) surrounding the specific geographic location 222 associated with the hot news story 102.

In another embodiment, a method includes associating a current event (e.g., the hot news 102 of FIG. 1) with a specific geographic location (e.g., the hot news location 222 of FIG. 2), and creating a group of neighboring users (e.g., the neighboring users 228A-N of FIG. 2) surrounding the specific geographic location 222 of the current event (e.g., the hot news 102) in a geo-spatial social network (e.g., of the geo-spatial environment 150 illustrated in FIG. 1).

In yet another embodiment, a system includes a news provider module (e.g., the news provider module 206 of FIG. 2) to determine a hot news story (e.g., the hot news 102 of FIG. 1) associated with a specific geographic location (e.g., the hot news location 222 of FIG. 2) and the specific geographic location 222, a hot news module (e.g., the hot news module 208 of FIG. 2) to display the hot news story 102 associated with the specific geographic location 222 on a map, and a geo-spatial environment 150 to process user-generated contents (e.g., the user-generated contents 152 of FIG. 1) associated with the hot news story 102.

FIG. 1 is a process view of a hot news story 102 published through a number of methods, according to one embodiment. Particularly, FIG. 1 illustrates a hot news 102, an eye witness 104, a police report 106, a word of mouth 108, a journalist 110, captures content 112, a published syndication 114, a television 116, a radio 118, a news paper 120, a neighborhood 122, neighboring users 124A-N, a neighboring eyewitness 126, a geo-spatial environment 150, user-generated contents 152 and a user-generated publication 154, according to one embodiment.

The hot news 102 may be any new information associated with events which are relayed through print (e.g., the news paper 120 of FIG. 1), broadcast (e.g., through the television 116 of FIG. 1), internet, and/or word of mouth 108 to a third party (e.g., the public). The eye witness 104 may be a source of first-hand knowledge (e.g., acquired through senses such as seeing, hearing, touching and/or smelling) about the hot news 102. The police report 106 may be a document submitted by the neighboring users 124A-N describing the hot news 102 in the neighborhood 122. The word of mouth 108 may be passing of information associated with the hot news 102 through verbal means (e.g., spoken communication) to an interested user (e.g., the journalist 110 of FIG. 1).

The journalist 110 may be a person interested in accessing and communicating (e.g., broadcasting through the television 116 and the radio 118, and/or publishing through the news paper 120) the hot news 102 in the neighborhood 122. The captures content 112 may be a process of syndicating the information associated with the hot news 102 acquired from the eye witness 104, the police report 106 and/or the word of mouth 108. The neighborhood 122 may correspond to a localized community which includes a specific geographic location (e.g., the hot news location 222 of FIG. 2) associated with the hot news 102 and the neighboring users 124A-N.

The neighboring users 124A-N may be individuals surrounding (e.g., living close to) the hot news location 222. The neighboring eyewitness 126 may be an entity having the first hand knowledge associated with the hot news 102. The geo-spatial environment 150 may process the user-generated contents 152 associated with the hot news 102. The user-generated contents 152 may be content provided by the neighboring users 124A-N surrounding the hot news 102 to the geo-spatial environment 150. The user-generated publication 154 may be a published form of the user-generated contents 152 submitted by the neighboring users 124A-N associated with the hot news 102 in the geo-spatial environment 150.

In the example embodiment illustrated in FIG. 1, the neighboring users 124A-N may be individuals located in a vicinity of the hot news location 222. The journalist 110 may access information associated with the hot news 102 directly from the neighboring users 124A-N, who have some information about the hot news 102. The journalist 110 may collect the information regarding the hot news 102 through multiple sources such as the eye witness 104, the police report 106 and/or the word of mouth 108. The journalist 110 may publish the collected information in the television 116, the radio 118 and/or news paper 120 as illustrated.

In another example embodiment illustrated in FIG. 1, the journalist 110 may access the information related to the hot news 102 uploaded by the neighboring users 124A-N through the geo-spatial environment 150. The geo-spatial environment 150 may enable the neighboring users 124A-N to submit the user-generated contents 152 in the geo-spatial environment 150. The journalist 110 may access the user-generated contents 152 through the user-generated publication 154 submitted to the geo-spatial environment 150. The geo-spatial environment 150 may enable communication between the neighboring users 124A-N surrounding the hot news location 222 and the journalist 110 who is interested in hot news 102. The journalist 110 may communicate with the neighboring users 124A-N regarding the hot news 102 through the geo-spatial environment 150. The journalist 110 may capture (e.g., store, record, track, etc.) information associated with the hot news 102 and/or syndicate the information in the television 116, the radio 118 and/or the news paper 120.

Figure 2:
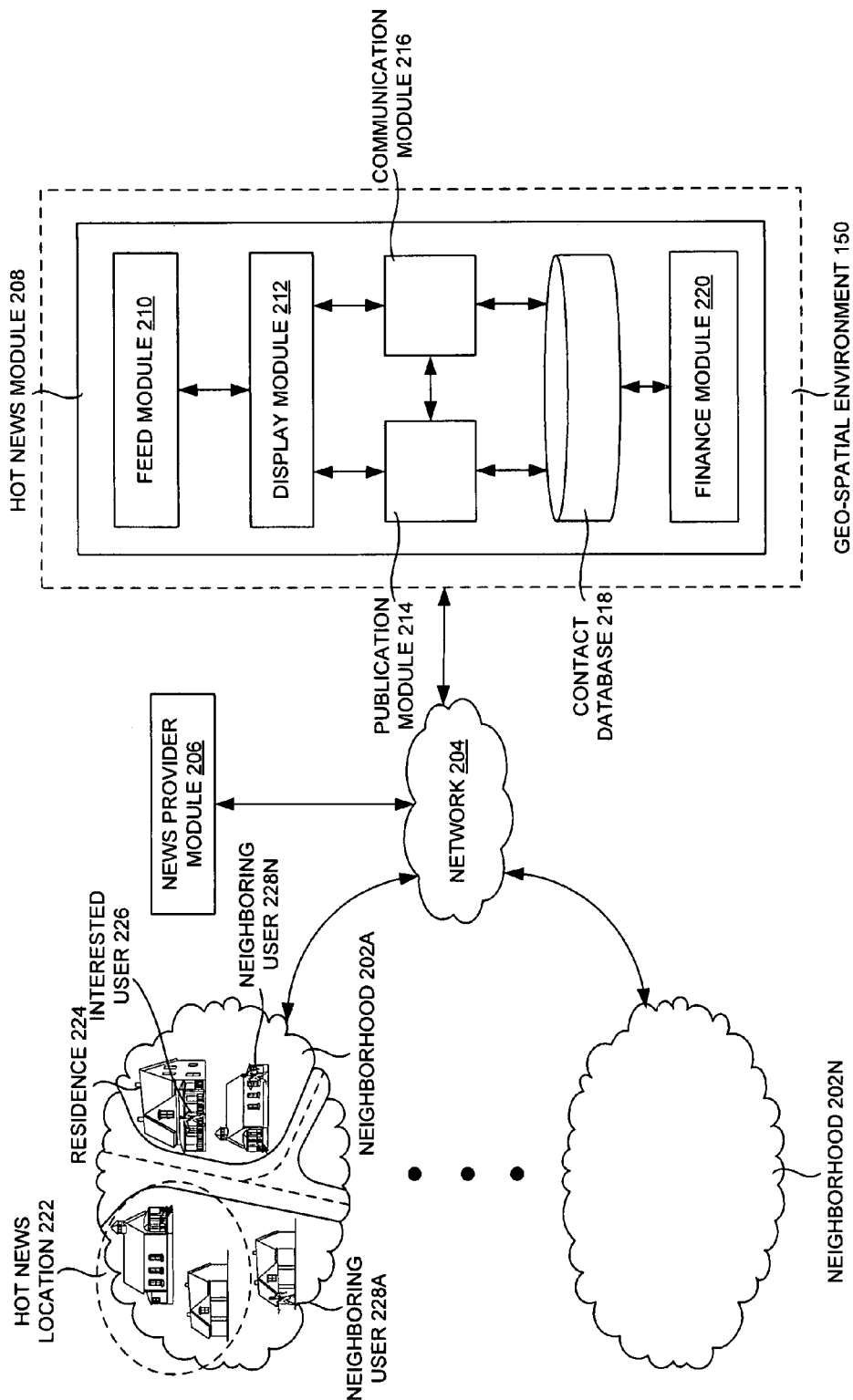
FIG. 2 is a system view of a geo-spatial environment communicating with neighborhood(s) of hot news locations through a network, according to one embodiment.

FIG. 2 is a system view of the geo-spatial environment 150 communicating with neighborhoods 202A-N of a hot news location 222 through a network 204, according to one embodiment. Particularly, FIG. 2 illustrates the geo-spatial environment 150, the neighborhoods 202A-N, the network 204, a news provider module 206, a hot news module 208, a feed module 210, a display module 212, a publication module 214, a communication module 216, a contact database 218, a finance module 220, the hot news location 222, a residence 224, an interested user 226 and neighboring users 228A-N, according to one embodiment.

The geo-spatial environment 150 may process a submission form associated with the hot news story (e.g., the hot news 102 of FIG. 1), submitted by the neighboring users 228A-N. For example, the submission form may include an audio file, a video file, a photo, an article, and/or a comment, related to the hot news story 102. The geo-spatial environment 150 may also enable the interested user 226 (e.g., the journalist 110 of FIG. 1) to access user-generated contents (e.g., the user-generated contents 152 of FIG. 1) associated with hot news story 102 having the hot news location 222 through the network 204. The neighborhoods 202A-N may correspond to a geographical region associated with the hot news location 222.

The neighborhoods 202A-N may include the interested user 226, the neighboring users 228A-N, the residence 224, businesses, organizations, etc. The network 204 may facilitate communication between the geo-spatial environment 150 and users (e.g., the neighboring users 228A-N and the interested user 226 of FIG. 2) of the neighborhoods 202A-N of the hot news location 222. The news provider module 206 may determine the hot news story 102 associated with the hot news location 222. For example, the news provider module 206 may display the hot news location 222 on a geo-spatial map (e.g., the geo-spatial map 620 of FIG. 6) using a news database (e.g., the news database 310 of FIG. 3).

The hot news module 208 may concomitantly display a headline of the hot news story 102 and the hot news location 222 associated with the hot news story 102 on the geo-spatial map 620. The feed module 210 may enable the neighboring users 228A-N to submit contents (e.g., title, location, audio file, video file, etc.) associated with the hot news story 102 having the hot news location 222 to the geo-spatial social network. The display module 212 may display the user-generated contents 152 associated with the hot news story 102 submitted by the neighboring users 228A-N on the geo-spatial map 620. The publication module 214 may syndicate the user-generated contents 152 of a submission form in a published media (e.g., the television, the radio, and/or the news paper).

The communication module 216 may process correspondences (e.g., email, communication, post, letters, IM, etc.) between the neighboring users 228A-N and the interested user 226 regarding the hot news story 102 in the geo-spatial environment 150. The contact database 218 may consist of contact details (e.g., user name, principal address, e-mail, contact telephone number, etc.) of neighboring users 228A-N in the geo-spatial environment 150. The finance module 220 may process a fee based transaction associated with accessing the user-generated contents 152 of the hot news story 102, for immediate communication with the neighboring users 228A-N, and/or marketing the user-generated contents 152 of the neighboring users 228A-N. The finance module 220 may distribute revenue amount among the neighboring users 228A-N and the geo-spatial social network.

The hot news location 222 may be a specific geographic location associated with the hot news story 102 in the neighborhoods 202A-N. The residence 224 may be a physical location (e.g., home, residential apartment, etc.) associated with the interested user 226 in the neighborhoods 202A-N. The interested user 226 may be an individual (e.g., journalist, police, reporter, etc.) who wishes to access the user-generated contents 152 published in the geo-spatial environment 150. The neighboring users 228A-N may be users residing in close proximity of the hot news location 222 associated with the hot news story 102.

In the example embodiment illustrated in FIG. 2, the geo-spatial environment 150 communicates with the neighborhoods 202A-N and the news provider module 206 through the network 204. The neighborhoods 202A-N consists of the residence 224 associated with the interested user 226, the neighboring users 228A-N, and the hot news location 222. The interested user 226 may communicate with the neighboring users 228A-N regarding the hot news story 102 through the network 204 using the geo-spatial environment 150. The interested user 226 may communicate with the neighboring users 228A-N using messages, instant messages, emails, voice calls, etc. The geo-spatial environment 150 includes the hot news module 208 which consists of the feed module 210, the display module 212, the publication module 214, the communication module 216, the contact database 218, and the finance module 220 interacting with each other.

A hot news story (e.g., the hot news 102 of FIG. 1) may be identified (e.g., using the news provider module 206 of FIG. 2). The hot news story 102 may be associated with a specific geographic location (e.g., the hot news location 222 of FIG. 2). A map (e.g., the geo-spatial map 620 of FIG. 6) concurrently displaying a headline of the hot news story 102 and the specific geographic location 222 may be generated (e.g., using the hot news module 208 of FIG. 2). Profiles associated with the neighboring users 228A-N surrounding the specific geographic location 222 associated with the hot news story 102 may be simultaneously displayed in the map.

The interested user 226 may be enabled to access user-generated contents 152 of submission form associated with the hot news story 102. A comment from the interested user 226, relating to the user-generated contents 152 of the submission form may be submitted. Contact information of the neighboring users 228A-N, located the threshold distance away from the specific geographic location 222 of the hot news story 102 may be generated (e.g., using the contact database 218 of FIG. 2-4).

A classified view of purchasable items may be generated when the neighboring users 228A-N markets goods associated with the hot news story 102. The users (e.g., the users 400 of FIG. 4) may be notified (e.g., using the hot news module 208 of FIG. 2) that the submission form associated with the hot news story 102 has been submitted. A current event (e.g., the hot news 102 of FIG. 1) may be associated with a specific geographic location (e.g., the hot news location 222 of FIG. 2). A group including neighboring users 228A-N surrounding the specific geographic location 222 of the current event (e.g., the hot news 102) may be created in a geo-spatial social network.

The news provider module 206 may determine the hot news story 102 and the specific geographic location 222 associated with the hot news story 102. The hot news module 208 may display the hot news story 102 associated with the specific geographic location 222 on a map (e.g., the geo-spatial map 620 of FIG. 6). The geo-spatial environment 150 may process the user-generated contents 152 associated with the hot news story 102. The communication module 216 may process correspondences between the neighboring users 228A-N and other users (e.g., the interested user 226 of FIG. 2 and/or the users 400 of FIG. 4) regarding the hot news story 102. The finance module 220 may allocate and distribute compensation from an interested user 226 (e.g., the reader user 400B, the journalist user 400C, and the reporter user 400N of FIG. 4) for accessing the user-generated contents 152 associated with the hot news story 102 and/or an immediate communication with the neighboring users 228A-N.

Figure 3:
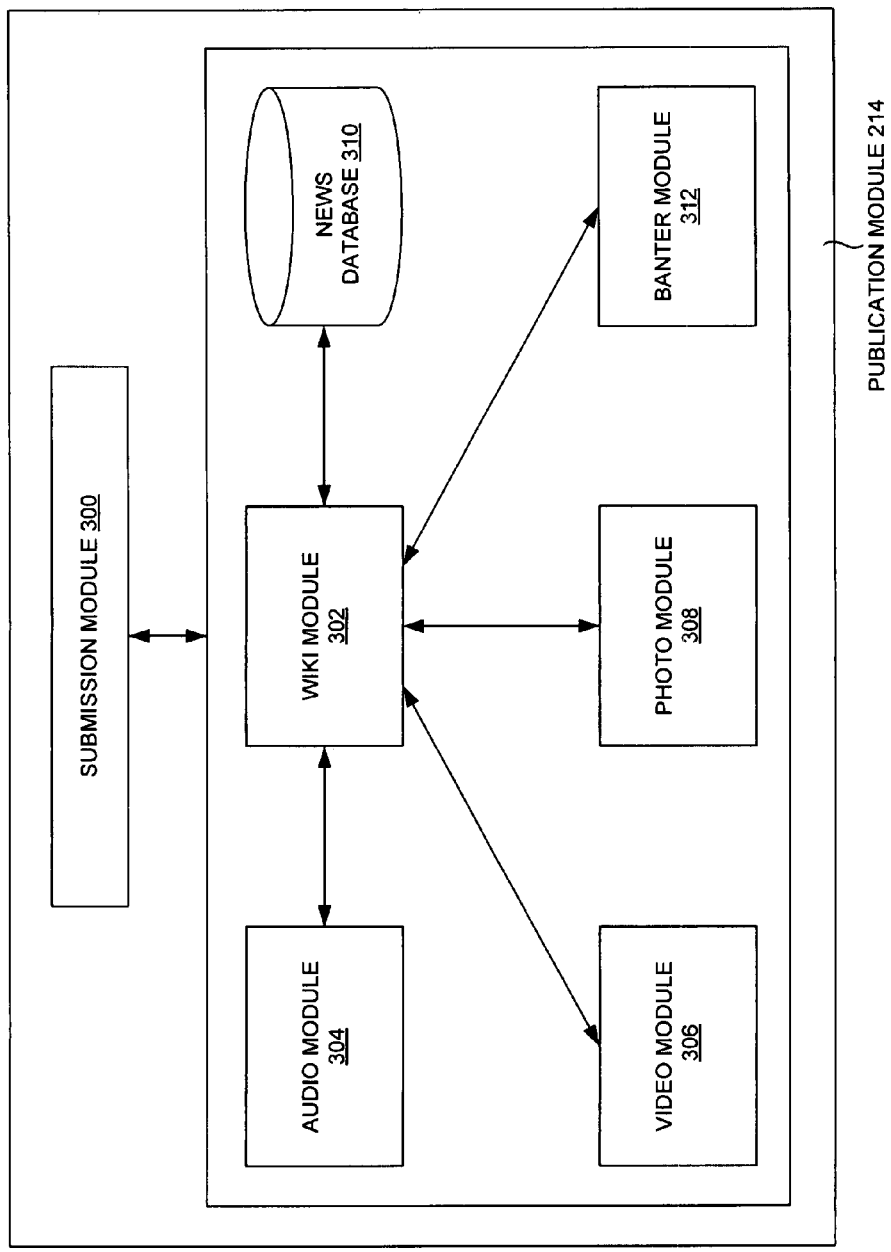
FIG. 3 is an exploded view of the publication module of FIG. 2, according to one embodiment.

FIG. 3 is an exploded view of the publication module 214 of FIG. 2, according to one embodiment. Particularly, FIG. 3 illustrates a submission module 300, a wiki module 302, an audio module 304, a video module 306, a photo module 308, a news database 310 and a banter module 312, according to one embodiment.

The submission module 300 may compile the user-generated contents 152 (e.g., audio file, video file, photo, comment, etc.) of a submission form associated with the hot news story 102 provided by the neighboring users 228A-N to the geo-spatial social network. The wiki module 302 may enable users (e.g., the interested user 226) to create and/or edit a wiki information on any event (e.g., the hot news story 102 of FIG. 1) associated with a specific geographic location (e.g., the hot news location 222 of FIG. 2).

The audio module 304 may process audio files of the submission form associated with the hot news story 102. The video module 306 may enable uploading and/or retrieving of information relating to video files of the submission form associated with the hot news story 102. The photo module 308 may process photographic images of the submission form associated with the hot news story 102. The news database 310 may contain the user-generated contents 152 (e.g., audio files, video files, and/or photos) and specific geographic locations (e.g., the hot news location 222 of FIG. 2) associated with hot news story 102 in the geo-spatial environment 150.

The banter module 312 may generate a chat room in which, the neighboring users 228A-N surrounding the hot news location 222 communicate with each other regarding the hot news story 102 in the geo-spatial environment 150.

In the example embodiment illustrated in the FIG. 3, the submission module 300 communicates with the wiki module 302, the audio module 304, the video module 306, the photo module 308, the news database 310 and the banter module 312 interacting with each other.

A submission form (e.g., having audio file, video file, photo, and/or comment) associated with the hot news story 102, of a neighboring users 228A-N located a threshold distance away from the specific geographic location 222 of the hot news story 102 may be processed (e.g., using the submission module 300 of FIG. 3). The user-generated contents 152 of the submission form may be syndicated (e.g., using the publication module 214 of FIG. 2) in a published media.

A chat room may be generated (e.g., using the banter module 312 of FIG. 3) such that the neighboring users 228A-N in the group may communicate with each other. The submission module 300 may compile the user-generated contents 152 associated with the hot news story 102 from the neighboring users 228A-N surrounding the specific geographic location 222 of the hot news story 102.

Figure 4:
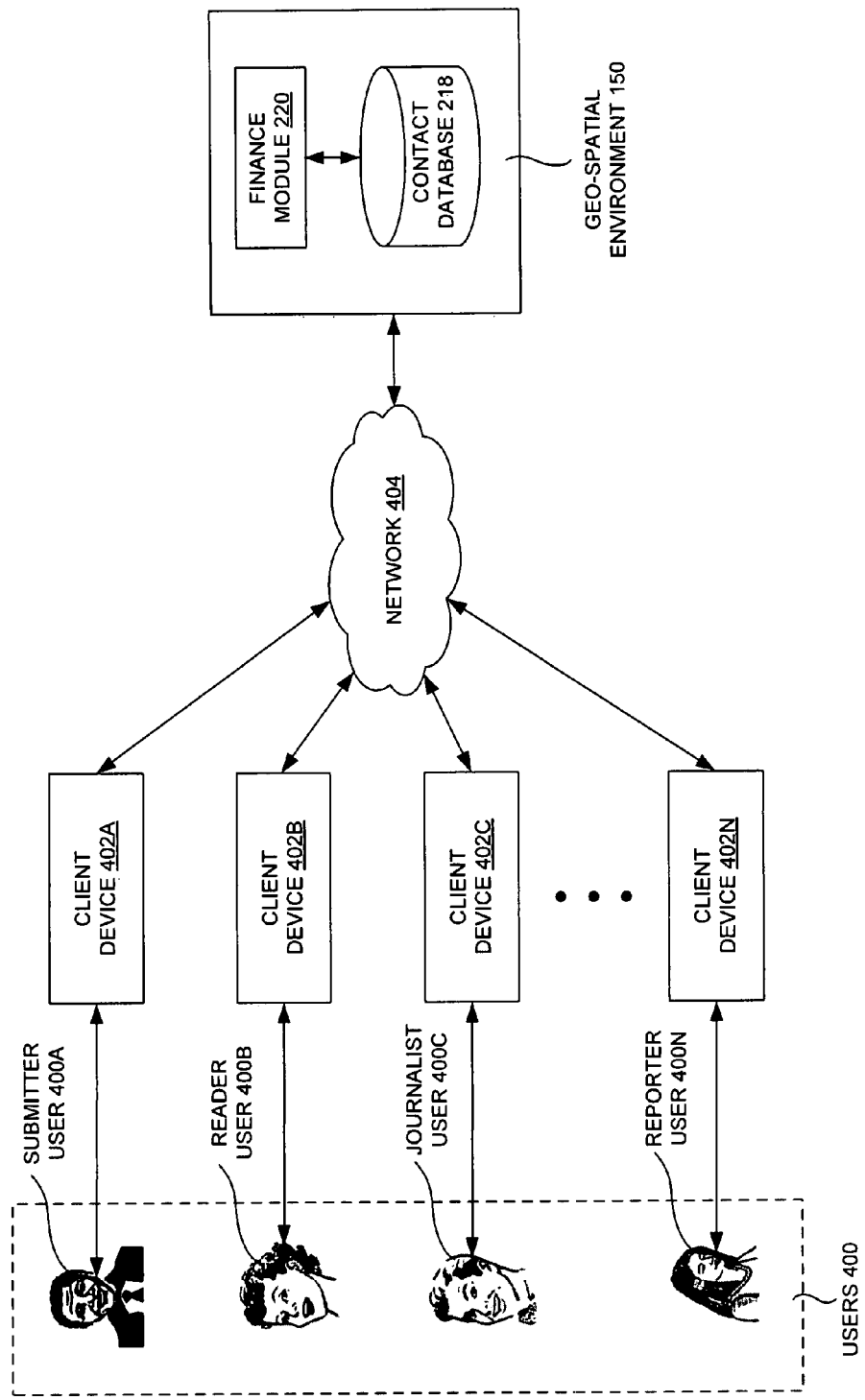
FIG. 4 is system view of the geo-spatial environment communicating with client devices through a network, according to one embodiment.

FIG. 4 is a system view of the geo-spatial environment 150 communicating with client devices 402A-N through a network 404 (e.g., the internet), according to one embodiment. Particularly, FIG. 4 illustrates the geo-spatial environment 150, the contact database 218, the finance module 220, users 400, a submitter user 400A, a reader user 400B, a journalist user 400C, a reporter user 400N, the client devices 402A-N and the network 404, according to one embodiment.

The users 400 may be individuals using the geo-spatial social network for submitting, accessing and/or retrieving the user-generated contents 152 associated with the hot news story 102. The users 400 may correspond to the submitter user 400A, the reader user 400B, the journalist user 400C and/or the reporter user 400N associated with the geo-spatial social network. The client devices 402A-N may enable processing and/or retrieving of the user-generated contents 152 associated with the hot news story 102 by the users 400 using the network 404 in the geo-spatial environment 150. The network 404 may facilitate communication between the users 400 having the client devices 402A-N and the geo-spatial environment 150.

In the example embodiment illustrated in FIG. 4, the users 400 communicate with the geo-spatial environment 150 through the client devices 402A-N. The geo-spatial environment 150 includes the contact database 218 and the finance module 220 communicating with each other. For example, the reader user 400B, the journalist user 400C and/or the reporter user 400N may access contact information of the submitter user 400A for immediate communication through the contact database 218 of the geo-spatial environment 150. In addition, the reader user 400B, the journalist user 400C and/or the reporter user 400N may compensate the submitter user 400A and the geo-spatial social network for the immediate communication through the finance module 220.

The neighboring users 228A-N (e.g., the submitter user 400A of FIG. 4) may be allowed (e.g., through the communication module 216 of FIG. 2) for an immediate communication through a geo-spatial social network regarding the hot news story 102. The neighboring users 228A-N may be compensated (e.g., using the finance module 220 of FIG. 2-4) with a consideration for the immediate communication regarding the hot news story 102. A percentage of the consideration may be allocated to the geo-spatial social network (e.g., through the finance module 220 of FIG. 2).

The user-generated contents 152 of the submission form of the neighboring users 228A-N may be marketed for sale. The neighboring users 228A-N may be compensated with a consideration. A percentage of the consideration may be allocated to the geo-spatial social network. An interested party (e.g., the reader user 400B, the journalist user 400C and/or the reporter user 400N of FIG. 4) may be enabled to contact the group regarding the current event (e.g., the hot news 102 of FIG. 1). The interested party (e.g., the interested user 226 of FIG. 2) may compensate the geo-spatial social network for access to contact information of a group. For example, the group may include neighboring users 228A-N surrounding the hot news location 222 in the geo-spatial environment 150.

FIG. 5 is a table view of user contact details, according to one embodiment. Particularly, FIG. 5 illustrates a user field 500, a proximity field 502, a principal address field 504, an e-mail field 506, a publication type field 508, an instant message field 510 and a contact number field 512, according to one embodiment.

The user field 500 may represent names of neighboring users 228A-N who have submitted user-generated contents (e.g., the user-generated contents 152 of FIG. 1) associated with the hot news story 102 to the geo-spatial environment 150. The proximity field 502 may represent a geographic proximity between neighboring users 228A-N and the hot news location 222. The principal address field 504 may display address data associated with the neighboring users 228A-N surrounding the hot news location 222 in the geo-spatial environment 150. The e-mail field 506 displays e-mail addresses associated with the neighboring users 228A-N of the user field 500 through which the interested user 226 may communicate with the neighboring users 228A-N regarding the hot news story 102.

The publication type field 508 may display the type of the user-generated contents 152 (e.g., video, audio, photo, banter, etc.) submitted by the neighboring users 228A-N to the geo-spatial social network. The instant message field 510 may display instant messages sent by the interested user 226. The contact number field 512 may display the contact number (e.g., mobile number, land line number, etc.) associated with the neighboring users 228A-N of the user field 500.

In the example embodiment illustrated in the FIG. 5, the user field 500 displays "John Smith" in first row, "Bill Harris" in second row, "Victor Drazen" in third row, "Chloe O'Hare" in fourth row and "Steve Lowry" in fifth row of the user field column 500. The proximity field 502 displays "Same Street" in the first row which represents that John Smith is located in the same street associated with the hot news location 222. The proximity field 502 also displays "1 Mile" in the second row which indicates Bill Harris is located 1 mile away from the hot news location 222. The proximity field 502 also displays "Next Door" in the third row which indicates Victor Drazen is a next door neighbor of the hot news location 222 associated with the hot news story 102. Similarly, the proximity field 502 displays "¼ Mile" in the fourth row and "½ Mile" in the fifth row of the proximity field column 502 which indicates the proximity between neighboring users (e.g., Chloe O'Hare and Steve Lowry) and the hot news location 222.

The principal address field 504 displays "222 Tulane RD." in the first row representing address data associated with John Smith, and "643 Sunrise DR." in the second row representing address data associated with Bill Harris. Similarly, the principal address field 504 also displays "386 Tulane RD." in the third row, "99 Hami AVE." in the fourth row and "64 Canyon CT." in the fifth row of the principal address field column 504.

The e-mail field 506 displays an e-mail address of John Smith "j.smith@moo.com" in the first row, an e-mail address of Bill Harris "billthekid@ash.com" in the second row, an e-mail address of Victor Drazen "24drazen@foxx.com" in the third row, an e-mail address of Chloe O'Hare "sirrom@ctu.edu" in the fourth row and an e-mail address of Steve Lowry "steve@cba.com" in the fifth row of the e-mail field column 506.

The publication type field 508 displays a "Video clip" associated with the hot news story 102 uploaded by John Smith in the first row, "Banter" submitted by Bill Harris in the second row, "Banter" submitted by Victor Drazen in the third row, "Audio" submitted by Chloe O'Hare in the fourth row and a "Photo" Submitted by Steve Lowry in the fifth row of the publication type field column 508.

The instant message field 510 displays "N/A" in the first row which indicates John Smith may not be available for immediate communication. The instant message field 510 also displays "Bill Harris" in the second row (e.g., the IM chat between Bill Harris and an interested user 226). The instant message field 510 also displays "N/A" in the third row (e.g., the IM chat between Victor Drazen and an interested user 226). Similarly, the instant message field 510 displays "N/A" in the fourth row and "N/A" in the fifth row of the instant message field column 510 (e.g., Chloe O'Hare and Steve Lowry are not available for communication).

The contact number field 512 displays "N/A" in the first row which indicates John Smith may not be available for telephonic conversation regarding the hot news story 102. The contact number field 512 displays "926-743-8527" in the second row which indicates Bill Harris may be available for telephonic conversation through the displayed contact number regarding the hot news story 102. Similarly, the contact number field 512 displays "926-743-1126" in the third row indication contact information of Victor Drazen, "N/A" in the fourth row and "N/A" in the fifth row of the contact number field column 512.

Figure 6:
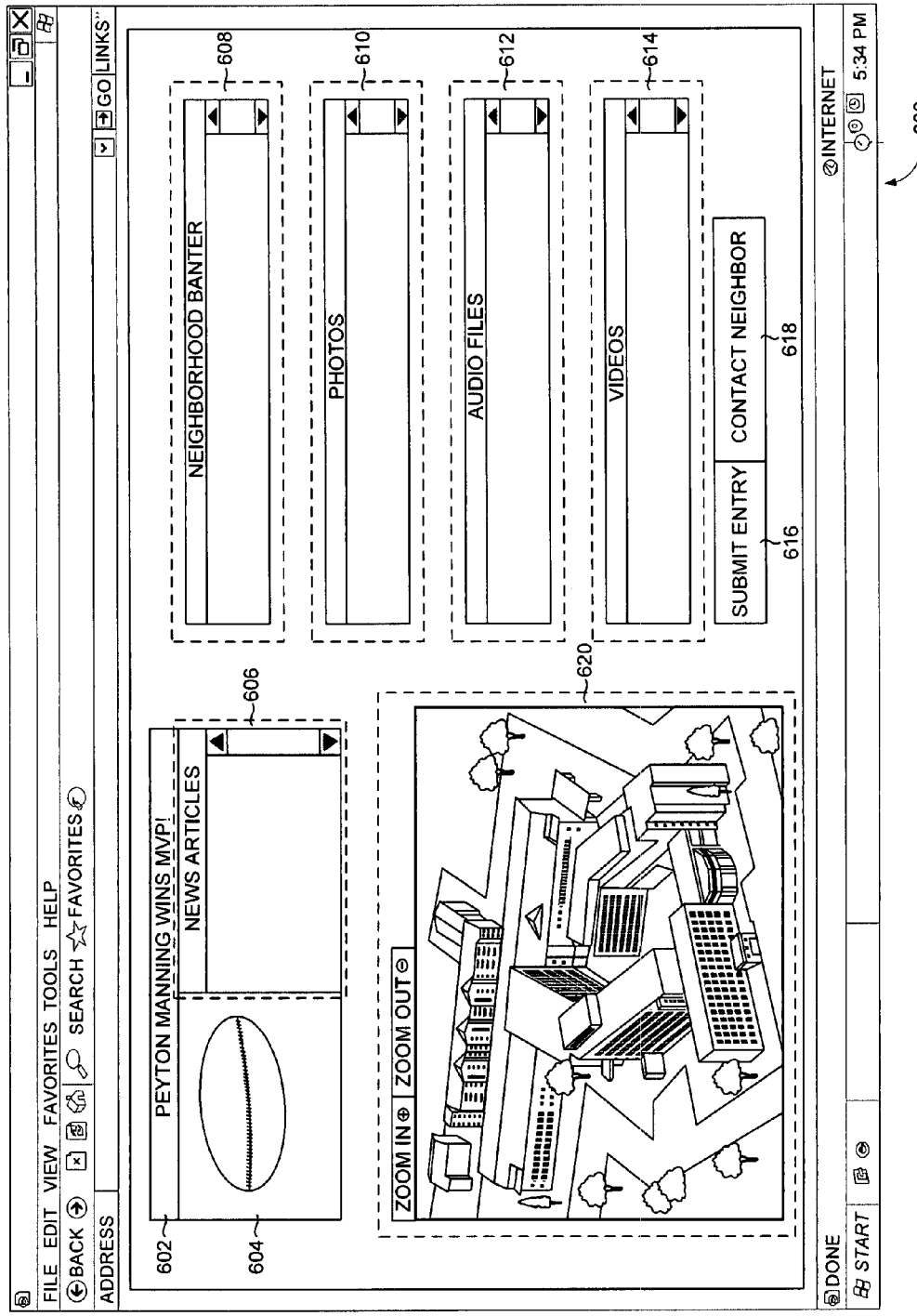
FIG. 6 is a user interface view of the display module of FIG. 2, according to one embodiment.

FIG. 6 is a user interface view 600 of the display module 212 of FIG. 2, according to one embodiment. Particularly, FIG. 6 illustrates a title block 602, a block 604, a news articles option 606, a neighborhood banter option 608, a photos option 610, an audio files option 612, a videos option 614, a submit entry option 616, a contact neighbor option 618 and a geo-spatial map 620, according to one embodiment.

The title block 602 may display a headline of a hot news story 102 on the geo-spatial map 620. The block 604 may display an image related to the hot news story 102 submitted by neighboring users 228A-N. The news articles option 606 may enable the interested user 226 to access articles associated with the hot news story 102. The neighborhood banter option 608 may enable the neighboring users 228A-N to submit comments associated with the hot news story 102. The photos option 610 may enable the neighboring users 228A-N to upload the photographic images associated with the hot news story 102.

The audio files option 612 may enable the neighboring users 228A-N to upload audio data (e.g., an audio file) associated with the hot news story 102. The videos option 614 may enable the neighboring users 228A-N to upload video data associated with the hot news story 102. The submit entry option 616 may enable the neighboring users 228A-N to submit user-generated contents 152 (e.g., photos, audio files, and/or videos) to the geo-spatial social network. The contact neighbor option 618 may enable the interested user 226 (e.g., the reader user 400B, the journalist user 400C and/or the reporter user 400N of FIG. 4) to contact the neighboring users 228A-N surrounding the hot news location 222 regarding the hot news story 102. The geo-spatial map 620 may display the hot news location 222 associated with the hot news story 102 in a neighborhood (e.g., the neighborhoods 202A-N of FIG. 2).

In the example embodiment illustrated in the FIG. 6, the user interface view 600 displays a headline "Peyton Manning wins MVP" associated with the hot news story 102 in the title block 602, and "an image" in the block 604 related to the hot news story 102. For example, the user interface view 600 also displays content published in magazines, newspapers, academic journals, and/or internet in the news articles option 606. The contact neighbor option 618 may enable the neighboring users 228A-N for immediate communication regarding the hot news story 102. The user interface view 600 also displays the user-generated contents 152 submitted by neighboring users 228A-N regarding the hot news story 102.

Figure 7:
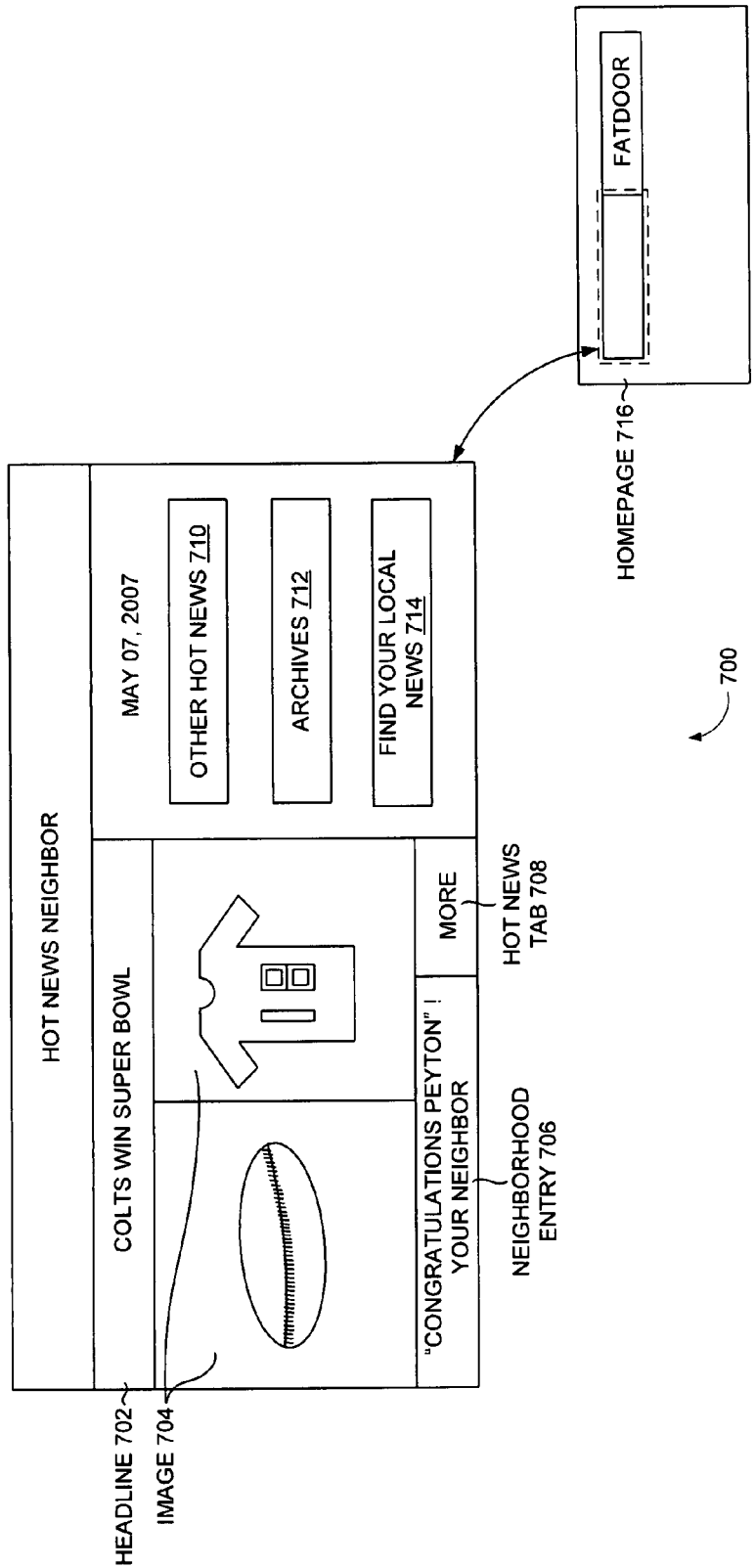
FIG. 7 is a user interface view of the banter module of FIG. 3, according to one embodiment.

FIG. 7 is a user interface view 700 of the banter module 312 of FIG. 3, according to one embodiment. Particularly, FIG. 7 illustrates a headline block 702, a block 704, a neighborhood entry option 706, a hot news tab 708, an other hot news option 710, an archives option 712, a find your local news option 714 and a homepage 716, according to one embodiment.

The headline block 702 may display a headline of a hot news story (e.g., the hot news 102 of FIG. 1) associated with a specific geographic location (e.g., the hot news location 222 of FIG. 2). The block 704 may display an image related to the hot news story 102, submitted by the neighboring users 228A-N surrounding the hot news location 222. The neighborhood entry option 706 may enable the interested user 226 to communicate with the neighboring users 228A-N surrounding the hot news location 222 regarding the hot news story 102. The hot news tab 708 may enable the interested user 226 to access user-generated contents (e.g., the user-generated contents 152 of FIG. 1) associated with the hot news story 102.

The other hot news option 710 may enable the interested user 226 to access the user-generated contents 152 of other news in the geo-spatial environment 150. The archives option 712 may contain archived records associated with a number of hot news stories. The find your local news option 714 may enable the interested user 226 to view news associated with a particular region (e.g., street, city, country, etc.). For example, the interested user 226 may access the find your local news option 714 to view latest news around his/her neighborhood (e.g., the neighborhoods 202A-N of FIG. 2) area through the geo-spatial social network. The homepage 716 may enable the interested user 226 to search one or more hot news stories through the geo-spatial social network.

In the example embodiment illustrated in the FIG. 7, the user interface view displays the headline "Colts win super bowl" associated with the hot news story 102. The neighborhood entry option 706 displays "Congratulations Peyton, your neighbor" conveying a congratulating message to Peyton by his neighbor. The block 704 displays photographs of "Rugby Ball" and "Player Jersey" associated with the hot news story 102. The user may enable to search for the user-generated contents 152 through the homepage 716 using the geo-spatial social network.

Figure 8:
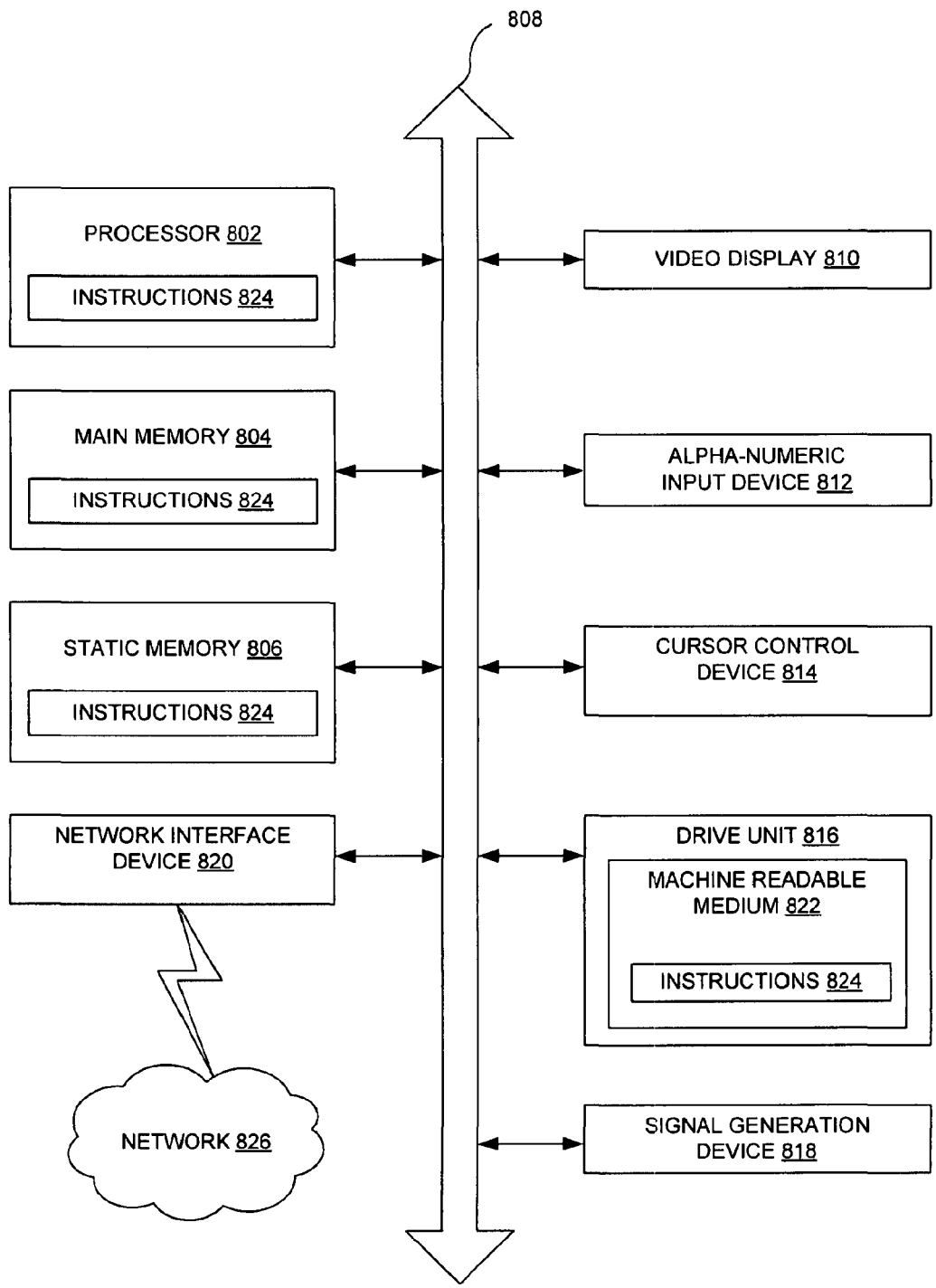
FIG. 8 is a diagrammatic system view of a data processing system in which any of the embodiments disclosed herein may be performed, according to one embodiment.

FIG. 8 is a diagrammatic system view 800 of a data processing system in which any of the embodiments disclosed herein may be performed, according to one embodiment. Particularly, the diagrammatic system view 800 of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The diagrammatic system view 800 may indicate a personal computer and/or a data processing system in which one or more operations disclosed herein are performed. The processor 802 may be microprocessor, a state machine, an application specific integrated circuit, a field programmable gate array, etc. (e.g., Intel® Pentium® processor). The main memory 804 may be a dynamic random access memory and/or a primary memory of a computer system.

The static memory 806 may be a hard drive, a flash drive, and/or other memory information associated with the data processing system. The bus 808 may be an interconnection between various circuits and/or structures of the data processing system. The video display 810 may provide graphical representation of information on the data processing system. The alpha-numeric input device 812 may be a keypad, keyboard and/or any other input device of text (e.g., special device to aid the physically handicapped). The cursor control device 814 may be a pointing device such as a mouse.

The drive unit 816 may be a hard drive, a storage system, and/or other longer term storage subsystem. The signal generation device 818 may be a bios and/or a functional operating system of the data processing system. The network interface device 820 may be a device that may perform interface functions such as code conversion, protocol conversion and/or buffering required for communication to and from a network. The machine readable medium 822 may provide instructions on which any of the methods disclosed herein may be performed. The instructions 824 may provide source code and/or data code to the processor 802 to enable any one/or more operations disclosed herein.

Figure 9:
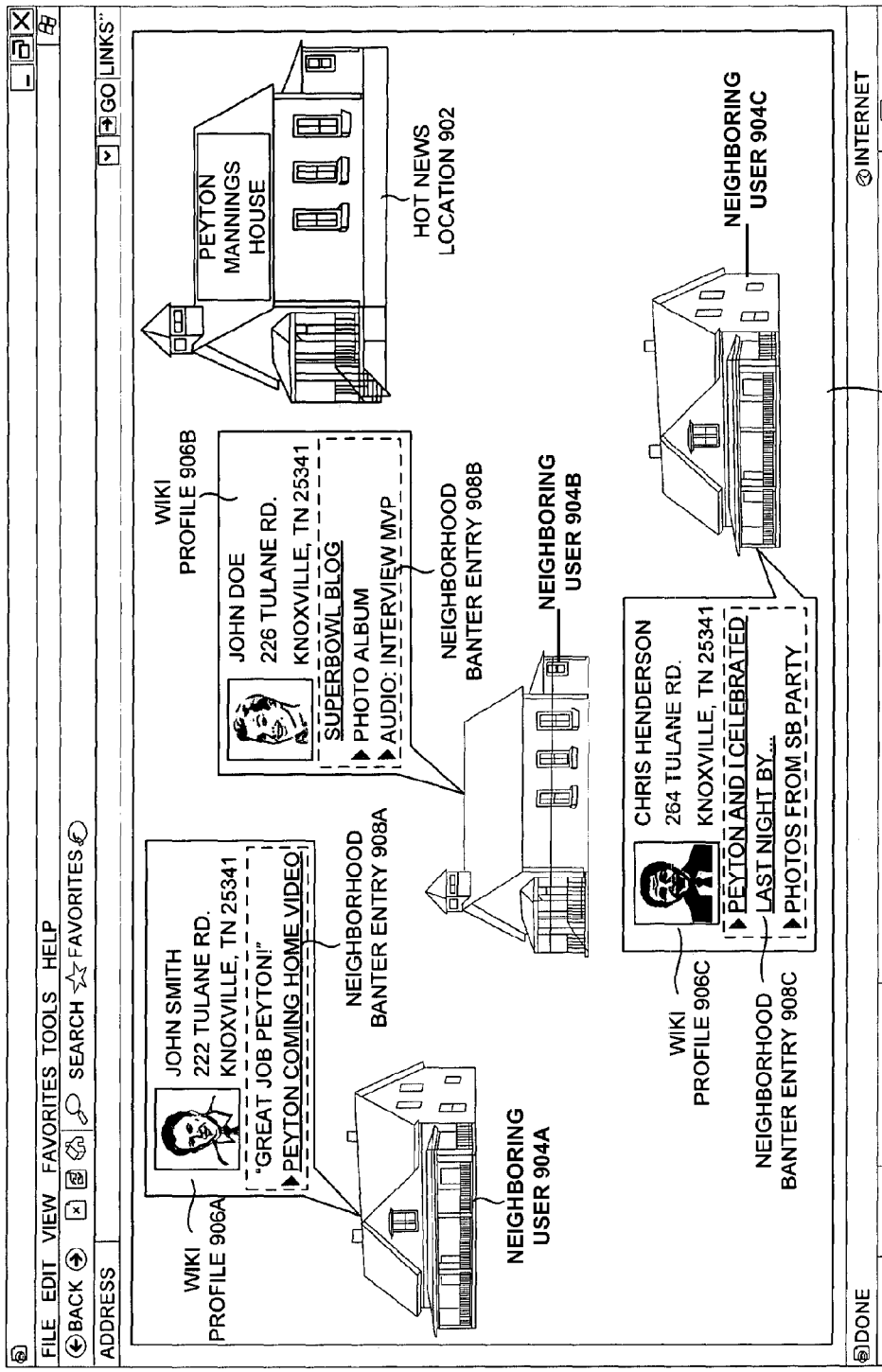
FIG. 9 is a user interface view of a hot news map illustrating neighborhood banter, according to one embodiment.

FIG. 9 is a user interface view 900 of a hot news map illustrating neighborhood banter, according to one embodiment. Particularly, FIG. 9 illustrates a hot news location 902, neighboring users 904A-C, wiki profiles 906A-C, a neighborhood banter entry link 908A-C and a neighborhood 910, according to one embodiment.

The hot news location 902 may represent a specific geographic location associated with a hot news story (e.g., the hot news 102 of FIG. 1) in the geo-spatial environment 150. The neighboring users 904A-C may be individuals surrounding (e.g., located in the vicinity of) the hot news location 902. The wiki profiles 906A-C may be profiles associated with the neighboring users 904A-C surrounding the hot news location 902. For example, the wiki profiles 906A-C may be created by the users (e.g., the users 400 of FIG. 4) of the geo-spatial social network. The neighborhood banter entry link 908A-C may enable the interested user (e.g., the reader user 400B, the journalist user 400C, and/or the reporter user 400N of FIG. 4) to access contents (e.g., video file, audio file, news articles, etc.) submitted by the neighboring users 904A-C regarding the hot news story 102.

The neighborhood banter entry link 908A-C may also enable the neighboring users 904A-C to market goods (e.g., autographed football of a football player, goods related to a crime, monuments, etc.) associated with hot news story 102 of the hot news location 902. The neighborhood 910 may be a geographically localized community which includes the hot news location 902, the neighboring users 904A-C surrounding the hot news location 902, located within a larger city, town and/or suburb.

In the example embodiment illustrated in FIG. 9, the user interface view 900 of the hot news map displays the wiki profile(s) 906A-C associated with the neighboring users 904A-C surrounding the hot news location 902 (e.g., Peyton Manning's house) in the hot news map. The wiki profile(s)

906A-C displays profile information (e.g., name, photo, address, etc.) of the neighboring users 904A-C and user-generated content (e.g., video files, audio files, articles, blogs, etc.) related to the hot news story 102.

The neighborhood banter entry link 908A-C displayed in the hot news map may enable the neighboring users 904A-C (e.g., John Smith, John Doe, Chris Henderson associated with the wiki profile(s) 906A-C) to communicate (e.g., using email, IM, SMS, mobile, etc.) with each other regarding the hot news story 102 associated with the hot news location 902.

Figure 10:
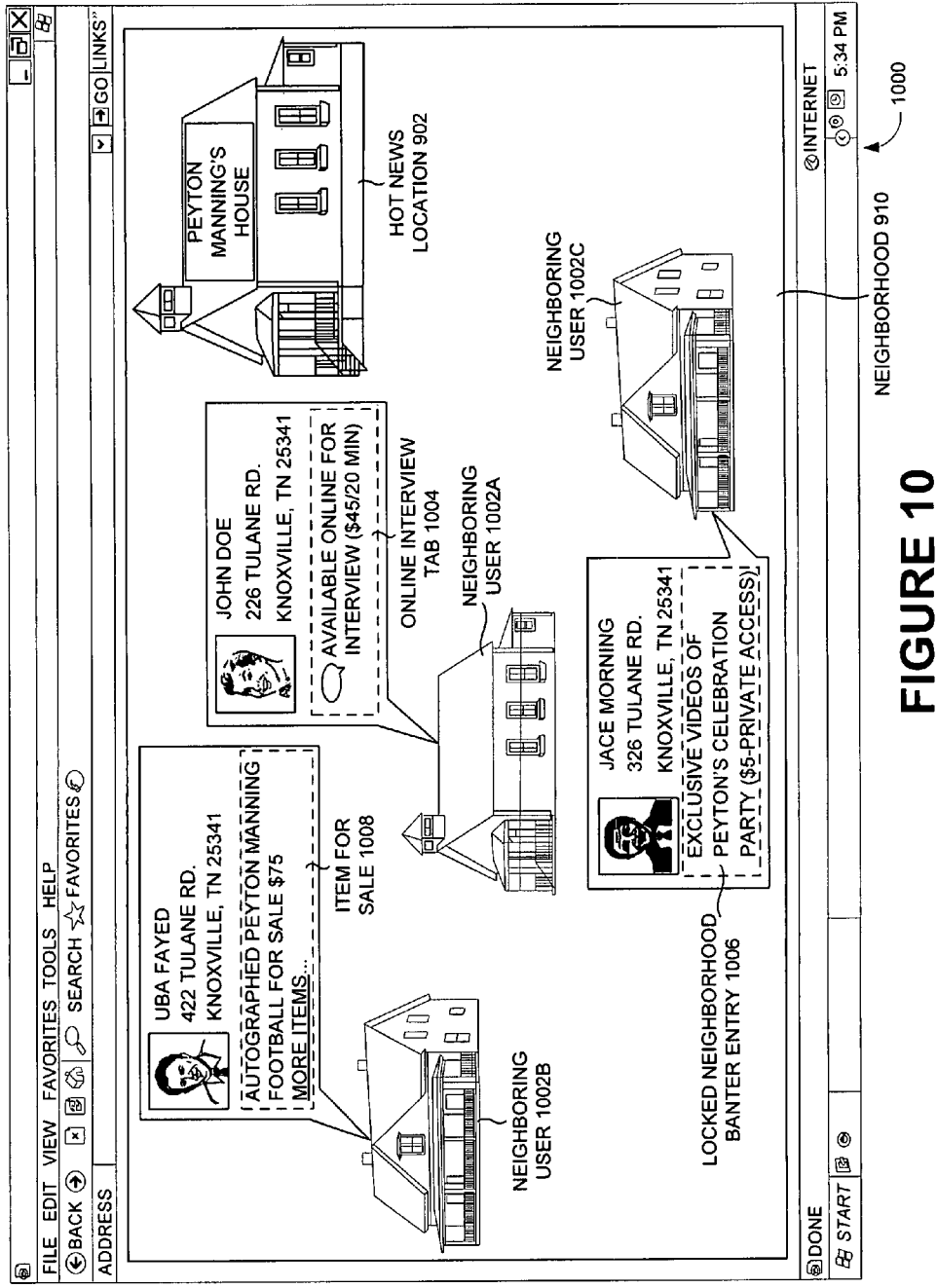
FIG. 10 is a user interface view of a hot news map illustrating neighborhood collectibles for sale, according to one embodiment.

FIG. 10 is a user interface view 1000 of a hot news map illustrating neighborhood collectibles for sale, according to one embodiment. Particularly, FIG. 10 illustrates a hot news location 902, the neighborhood 910, neighboring users 1002A-C, an online interview tab 1004, a locked neighborhood banter entry 1006 and an item for sale 1008, according to one embodiment.

The hot news location 902 may be a specific geographic location (e.g., Peyton Manning's house) associated with a hot news story 102 in the geo-spatial environment 150. The neighboring user(s) 1002A-C may be individuals residing a threshold distance away from the hot news location 902 in the neighborhood 910. The online interview tab 1004 may enable the neighboring user 1002A for an immediate communication through the geo-spatial social network. The online interview tab 1004 may display information that the neighboring user 1002A is available for online interview regarding the hot news story 102. The locked neighborhood banter entry 1006 may display locked contents associated with the neighborhood banter of the neighboring user 1002C. The item for sale 1008 may display goods that the neighboring user 1002B wishes to sell.

In the example embodiment illustrated in FIG. 10, the user interface view 1000 of the hot news map displays the hot news location 902 associated with the hot news story 102. The online interview tab 1004 displays "available online for interview ($45/20 min)" associated with the neighboring user 1002A (e.g., John Doe). The locked neighborhood banter entry 1006 displays the locked user-generated content "exclusive videos of Peyton's celebration party". The items for sale 1008 displays item "autographed Peyton Manning football for sale $75" associated with the neighboring user 1002B (e.g., Uba Fayed).

The user-generated contents (e.g., the user-generated contents 152 of FIG. 1) of the submission form of the neighboring users 1002A-C may be locked. The interested user 226 may be charged a consideration for access to the user-generated contents 152 of the submission form of the neighboring users 1002A-C. The neighboring users 1002A-C may be compensated with the consideration. A percentage of the consideration may be allocated to the geo-spatial social network (e.g., through the finance module 220 of FIG. 2). The user-generated contents 152 of the submission form may be evaluated in response to a request of a moderator, prior to locking the user-generated contents.

Figure 11:
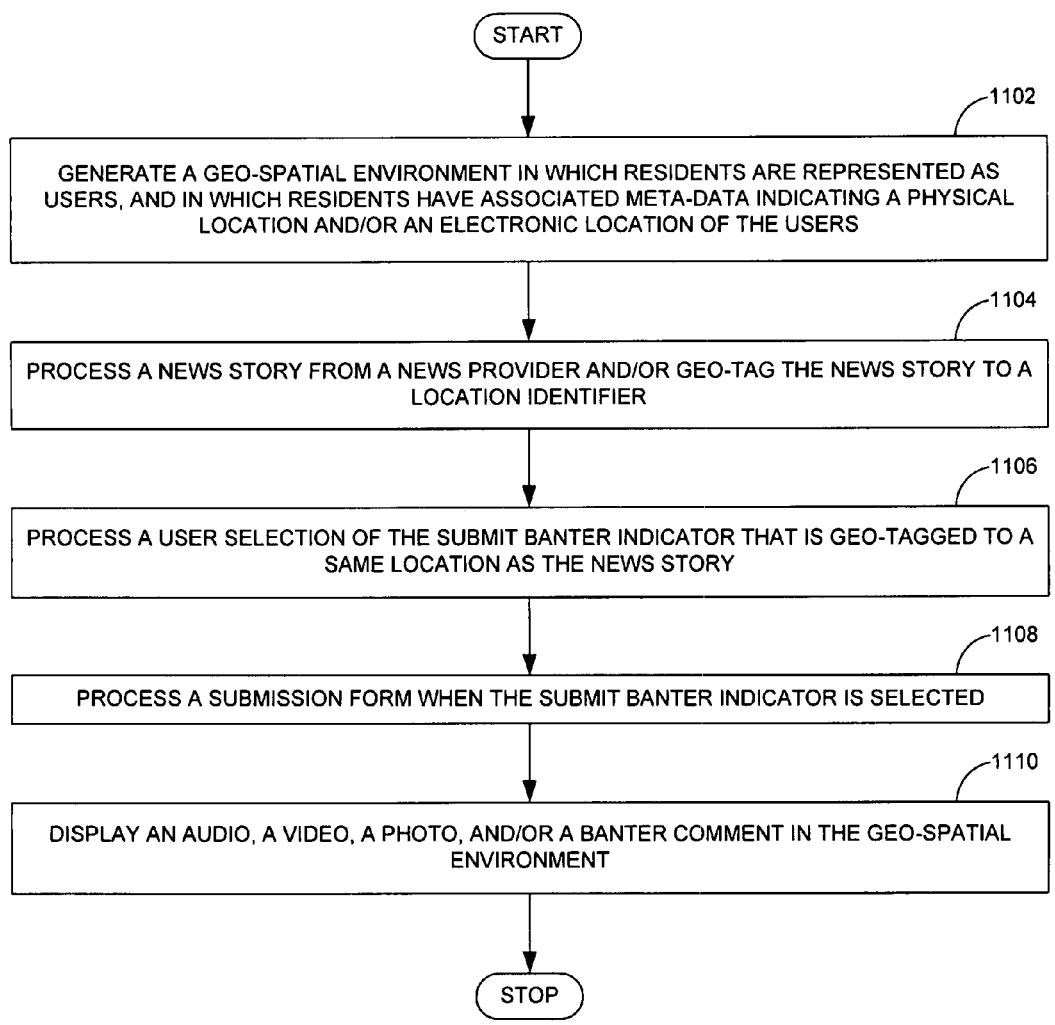
FIG. 11 is a process flow of generating, submitting, and displaying a user, generated content in the geo-spatial environment, according to one embodiment.

FIG. 11 is a process flow of processing contents associated with the submission form of neighboring users (e.g., the neighboring users 228A-N of FIG. 2), according to one embodiment. In operation 1102, a geo-spatial environment (e.g., the geo-spatial environment 150 of FIG. 1) may be generated, in which residents are represented as users and in which residents have associated meta-data indicating a physical location and/or an electronic location of the users. In operation 1104, a news story (e.g., the hot news 102 of FIG. 1) from a news provider may be processed (e.g., using the news provider module 206 of FIG. 2) and/or geo-tagged to a location identifier.

In operation 1106, a user selection of the submit banter indicator that is geo-tagged to the same location as the news story (e.g., the hot news 102 of FIG. 1) may be processed (e.g., using the banter module 312 of FIG. 3). In operation 1108, a submission form may be processed (e.g., using the submission module 300 of FIG. 3) when the submit banter indicator is selected. In operation 1110, an audio, a video, a photo, and/or a banter comment may be displayed (e.g., using the display module 212 and/or the publication module 214 of FIG. 2) in the geo-spatial environment 150.

Figure 12A:
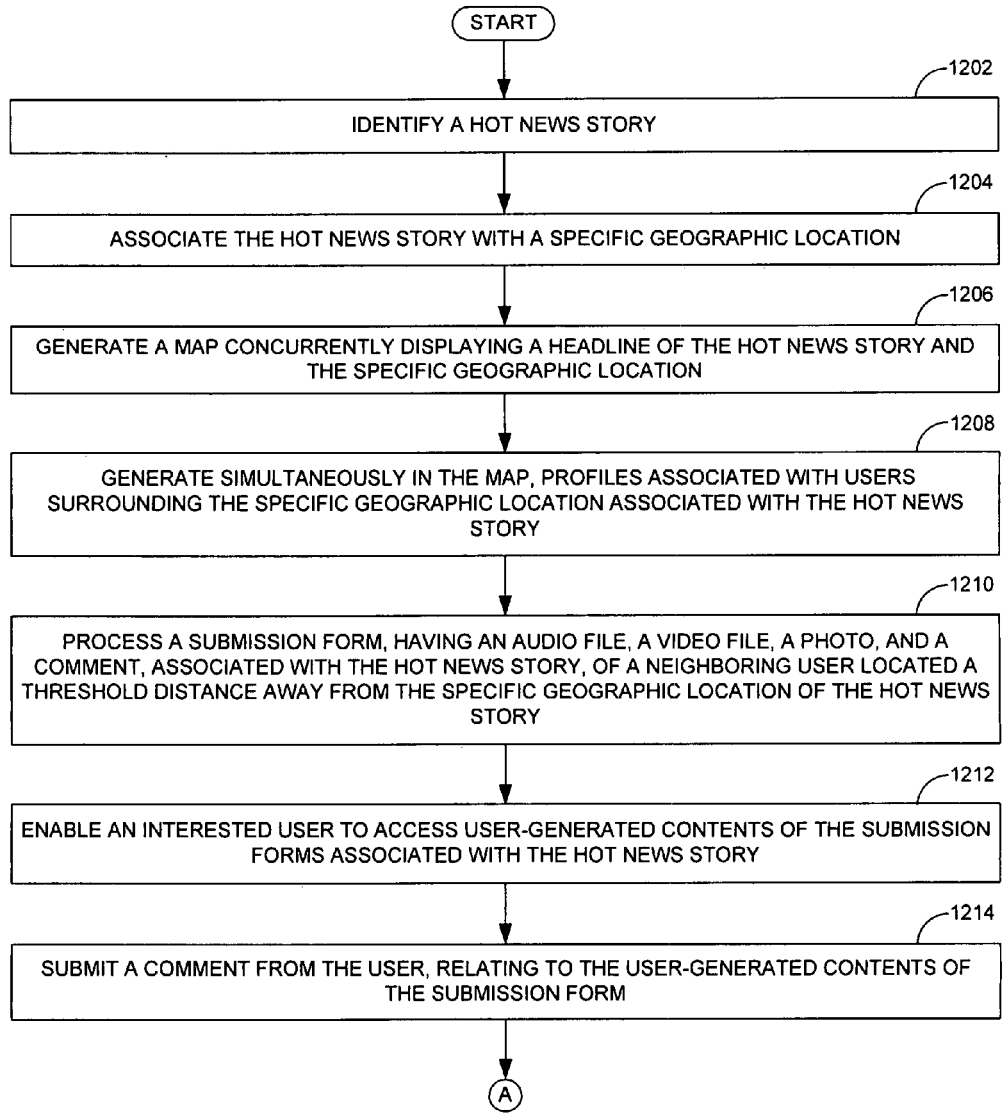
FIG. 12A is a process flow of the hot news module of FIG. 2, according to one embodiment.

FIG. 12A is a process flow of the hot news module 208 of FIG. 2, according to one embodiment. In operation 1202, a hot news story (e.g., the hot news 102 of FIG. 1) may be identified (e.g., using the news provider module 206 of FIG. 2). In operation 1204, the hot news story 102 may be associated with a specific geographic location (e.g., the hot news location 222 of FIG. 2). In operation 1206, a map (e.g., the geo-spatial map 620 of FIG. 6) concurrently displaying a headline of the hot news story 102 and the specific geographic location 222 may be generated (e.g., using the hot news module 208 of FIG. 2).

In operation 1208, profiles associated with users (e.g., the neighboring users 228A-N of FIG. 2) surrounding the specific geographic location associated with the hot news story 102 may be simultaneously displayed (e.g., using the display module 212 of FIG. 2) in the map. In operation 1210, a submission form, having an audio file, a video file, a photo, and/or a comment, associated with the hot news story 102, of a neighboring user 228A-N located a threshold distance away from the specific geographic location 222 of the hot news story 102 may be processed (e.g., using the submission module 300 of FIG. 3).

In operation 1212, an interested user (e.g., the interested user 226 of FIG. 2) may be enabled to access user-generated contents (e.g., the user-generated contents 152 of FIG. 1) of the submission forms associated with the hot news story 102. In operation 1214, a comment from the interested user 226, relating to the user-generated contents 152 of the submission form may be submitted (e.g., using the communication module 216 of FIG. 2).

Figure 12B:
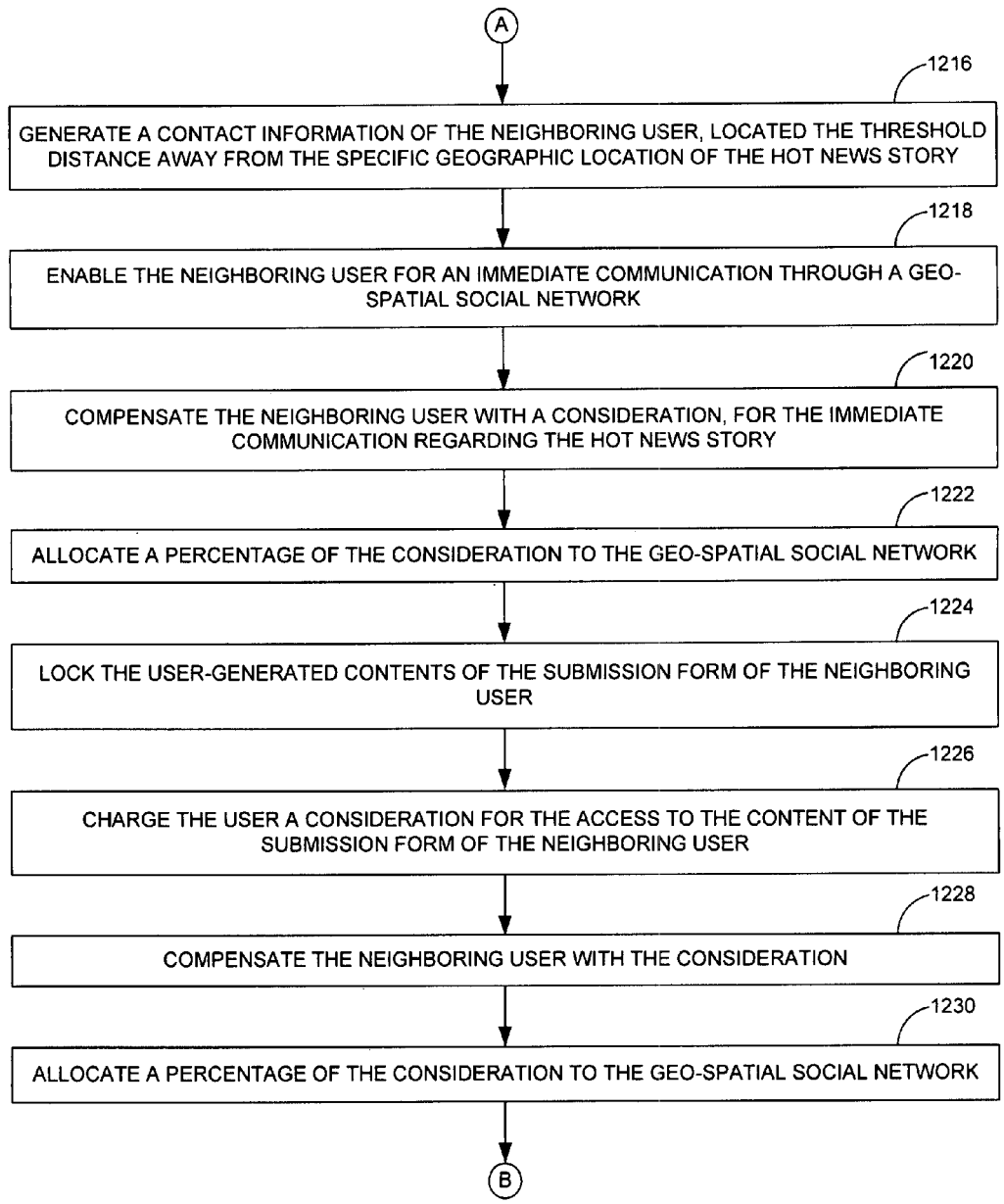
FIG. 12B is a continuation of the process flow of FIG. 12A, showing additional processes, according to one embodiment.

FIG. 12B is a continuation of the process flow of FIG. 12A, showing additional processes, according to one embodiment. In operation 1216, contact information of the neighboring users 228A-N, located the threshold distance away from the specific geographic location 222 of the hot news story 102 may be generated (e.g., using the contact database 218 of FIG. 2). In operation 1218, the neighboring user 228A-N may be enabled (e.g., using the communication module 216 of FIG. 2) for an immediate communication through a geo-spatial social network.

In operation 1220, the neighboring user 228A-N may be compensated (e.g., using the finance module 220 of FIG. 2-4) with a consideration for the immediate communication regarding the hot news story 102. In operation 1222, a percentage of the consideration may be allocated (e.g., using the finance module 220 of FIG. 2-4) to the geo-spatial social network. In operation 1224, the user-generated contents 152 of the submission form of the neighboring user 228A-N may be locked (e.g., using the locked neighborhood banter entry 1006 of FIG. 10). In operation 1226, the user (e.g., the interested user 226) may be charged (e.g., using the finance module 220 of FIG. 2-4) a consideration for access to the content (e.g., the user-generated contents 152) of the submission form of the neighboring user 228A-N.

In operation 1228, the neighboring user 228A-N may be compensated (e.g., using the finance module 220 of FIG. 2-4) with the consideration (e.g., a financial disbursement). In operation 1230, a percentage of the consideration may be allocated to the geo-spatial social network.

Figure 12C:
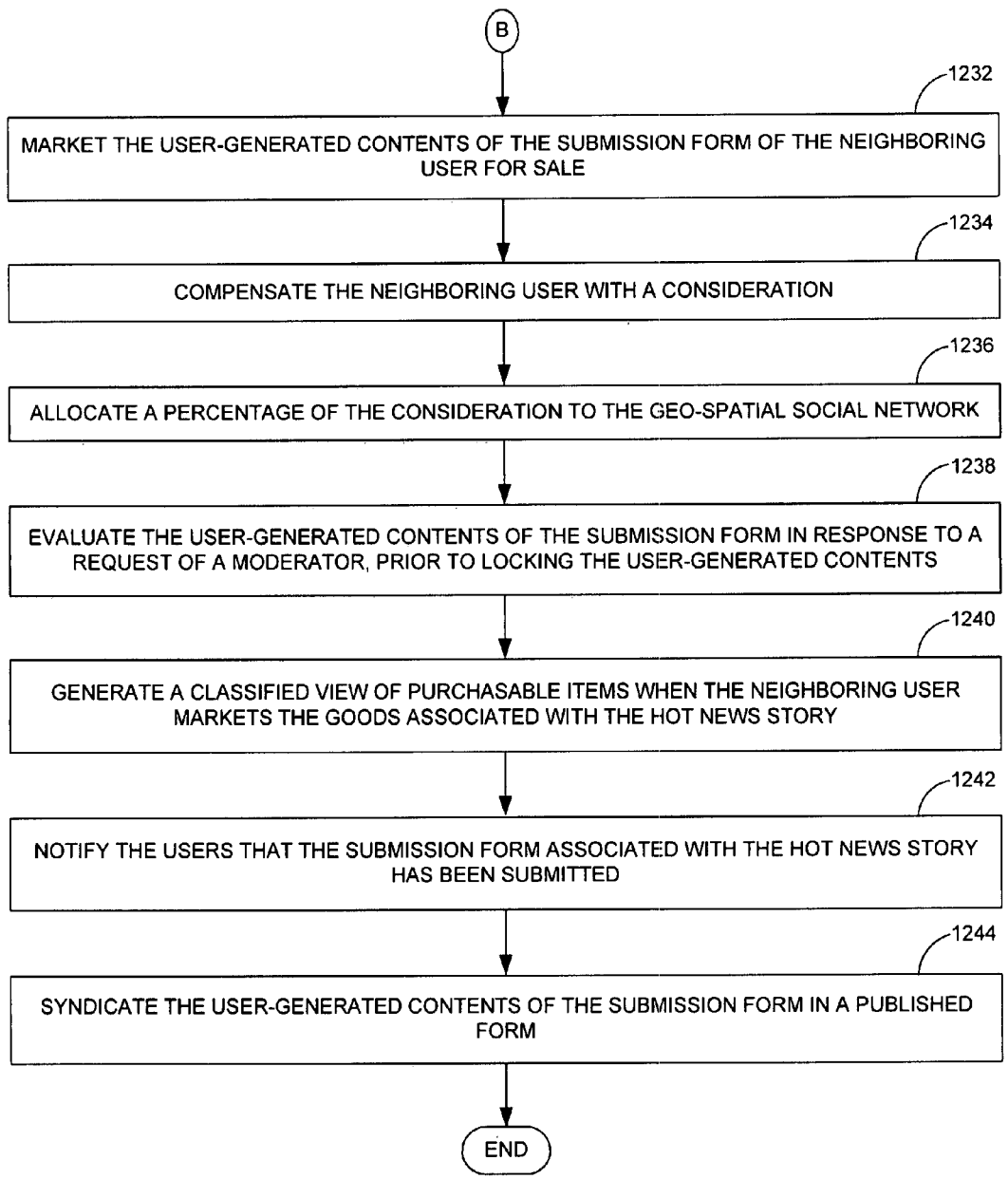
FIG. 12C is a continuation of the process flow of FIG. 12B, showing additional processes, according to one embodiment.

FIG. 12C is a continuation of the process flow of FIG. 12B, showing additional processes, according to one embodiment. In operation 1232, the user-generated contents 152 of the submission form of the neighboring user 228A-N may be marketed for sale. In operation 1234, the neighboring user 228A-N may be compensated (e.g., using the finance module 220 of FIG. 2-4) with a consideration. In operation 1236, a percentage of the consideration may be allocated to the geo-spatial social network.

In operation 1238, the user-generated contents 152 of the submission form may be evaluated in response to a request of a moderator, prior to locking the user-generated contents 152. In operation 1240, a classified view of purchasable items may be generated when the neighboring user 228A-N markets goods associated with the hot news story 102. In operation 1242, the users (e.g., of the geo-spatial social network and/or the geo-spatial environment 150) may be notified (e.g., using the publication module 214 of FIG. 2) that the submission form associated with the hot news story 102 has been submitted (e.g., using the news provider module 206 of FIG. 2). In operation 1244, the user-generated contents 152 of the submission form may be syndicated (e.g., using the publication module 214 of FIG. 2) in a published media.

Figure 13:
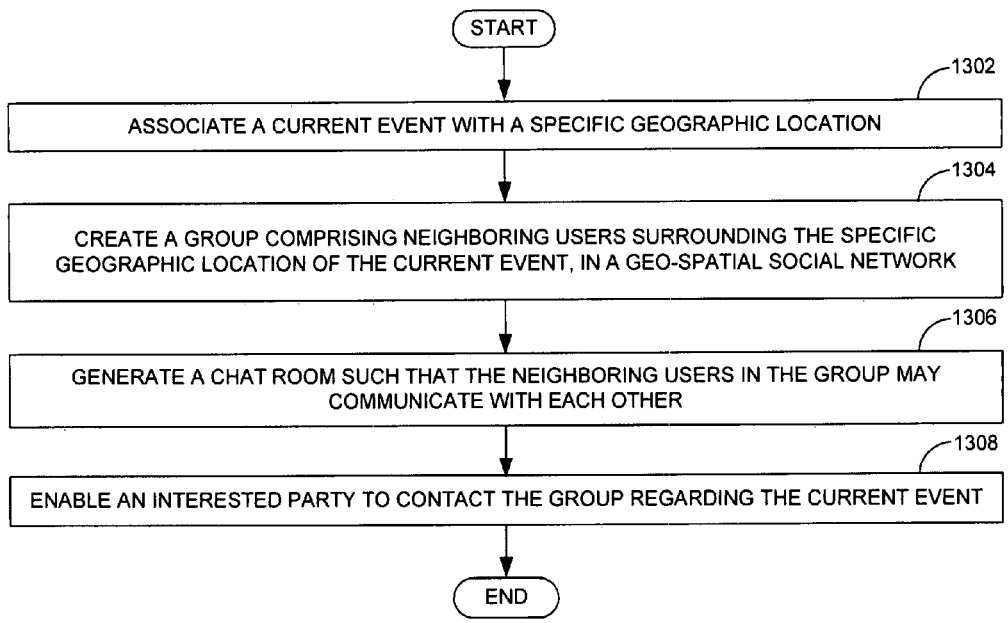
FIG. 13 is a process flow of an interested part contacting a group consisting of neighboring users surrounding a hot news location, according to one embodiment.

FIG. 13 is a process flow of an interested party (e.g., the interested user 226 of FIG. 2) contacting a group consisting of neighboring users (e.g., the neighboring users 228A-N of FIG. 2) surrounding a specific geographic location (e.g., the hot news location 222 of FIG. 2), according to one embodiment. In operation 1302, a current event (e.g., the hot news 102 of FIG. 1) may be associated (e.g., using the news provider module 206 of FIG. 2) with the specific geographic location (e.g., the hot news location 222 of FIG. 2). In operation 1304, a group comprising the neighboring users 228A-N surrounding the specific geographic location 222 of the current event in a geo-spatial social network may be created (e.g., using the contact database 218 of FIG. 2). In operation 1306, a chat room may be generated (e.g., using the banter module 312 of FIG. 3) such that the neighboring users 228A-N in the group may communicate with each other. In operation 1308, an interested party (e.g., the interested user 226 of FIG. 2) may be enabled to contact (e.g., using the communication module 216 of FIG. 2) the group regarding the current event (e.g., the hot news 102).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and/or electrical circuits (e.g., Application Specific Integrated Circuitry (ASIC), Digital Signal Processor (DSP) circuitry, etc.).

For example, the news provider module 206, the hot news module 208, the feed module 210, the display module 212, the publication module 214, the communication module 216, the finance module 220, the submission module 300, the wiki module 302, the audio module 304, the video module 306, the photo module 308, the banter module 312 and other modules of FIGS. 1-13 may be enabled using a news provider circuit, a hot news circuit, a feed circuit, a display circuit, a publication circuit, a communication circuit, a finance circuit, a submission circuit, a wiki circuit, a audio circuit, a video circuit, a photo circuit, a banter circuit and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method for providing users of information with timely information about a news story related to the geographic locations of the users, the method comprising the steps of:

receiving a submission of a news story from the Internet via a computer network interface device, the news story comprising a geographic location of the news story, a description of the details of the news story and information related to the marketing of goods associated with the news story;

searching a contact database, the contact database stored on a computer and comprising electronic contact information and geographic location information for a plurality of users, to select users whose geographic locations indicate a proximity to the geographic location of the news story;

providing, via the computer network interface device, the selected users with the geographic location of the news story, the description of the details of the news story, and the information related to the marketing of goods associated with the news story;

enabling an interested user to form an immediate communication in the form of an online interview with at least one of a neighboring user surrounding the specific geographic location of the news story;

generating a contact information of users, wherein the contact information comprises at least one of an email address, an instant message identification and a telephonic contact number; and permitting other users to access the contact information of the user when the user makes a submission in order to permit immediate communication between at least the other user and the submitter user.

2. The method of claim 1, where:
the description of the details of the news story comprises an audio file.

3. The method of claim 1, where:
the description of the details of the news story comprises a video file.

4. The method of claim 1, where:
the description of the details of the news story comprises a photograph.

5. The method of claim 1, where:
the description of the details of the news story comprises text.

6. The method of claim 1, further comprising the step of:
allowing one of the selected users to communicate with another of the selected users regarding the news story.

7. The method of claim 1, further comprising the step of:
allowing one of the selected users to upload comments associated with the news story.

8. The method of claim 1, further comprising the step of:
allowing one of the selected users to upload photographs associated with the news story.

9. The method of claim 1, further comprising the step of:
allowing one of the selected users to upload audio associated with the news story.

10. The method of claim 1, further comprising the step of:
allowing one of the selected users to upload video associated with the news story.

11. The method of claim 1, where:
the step of providing the selected users with the description of the details of the news story is accomplished using email.

12. The method of claim 1, where:
the step of providing the selected users with the description of the details of the news story is accomplished using instant messaging.

13. The method of claim 1, where:
the step of providing the selected users with the description of the details of the news story is accomplished by displaying it on a user interface.

14. The method of claim 1, further comprising the step of creating a group of users comprising at least the other user and the submitter user.

15. A computer system for providing interested users with timely information about a news story occurring near the physical address of the interested users, the computer system comprising:
an interface to a first computer, the first computer being associated with a submitter of a news story, the news story comprising a geographic location of the news story, a description of the details of the news story and information related to the marketing of goods associated with the news story;
an interface to a plurality of additional computers, the additional computers being associated with interested users of the news story;
a contact database of information about potential interested users, the information comprising an electronic address and a physical address for each of the potential interested users;
a processor comprising software for receiving the news story via the interface to the first computer, for searching the contact database to select interested users, from among the potential interested users, whose physical addresses indicate a proximity to the geographic location of the news story, for electronically notifying the interested users about the news story via the interface to the additional computers, for enabling an interested user to form an immediate communication in the form of an online interview with at least one of a neighboring user surrounding the specific geographic location of the news story, generating a contact information of users, wherein the contact information comprises at least one of an email address, an instant message identification and a telephonic contact number, and permitting other users to access the contact information of the user when the user makes a submission in order to permit immediate communication between at least the other user and the submitter user.

16. The computer system of claim 14, where:
the description of the details of the news story comprises an audio file.

17. The computer system of claim 14, where:
the description of the details of the news story comprises a video file.

18. The computer system of claim 14, where:
the description of the details of the news story comprises a photograph.

19. The computer system of claim 14, where:
the description of the details of the news story comprises text.

20. The computer system of claim 14, where:
the processor further comprises software for allowing one of the interested users to communicate with another of the interested users regarding the news story.

21. The computer system of claim 14, where:
the processor further comprises software for allowing an interested user to upload comments associated with the news story.

22. The computer system of claim 14, where:
the processor further comprises software for allowing an interested user to upload photographs associated with the news story.

23. The computer system of claim 14, where:
the processor further comprises software for allowing an interested user to upload audio associated with the news story.

24. The computer system of claim 14, where:
the processor further comprises software for allowing an interested user to upload audio associated with the news story.

25. The computer system of claim 14, where:
the software notifies the interested users of the news story via email.

26. The computer system of claim 14, where:
the software notifies the interested users of the news story via instant messaging.

27. The computer system of claim 14, where:
the software notifies the interested users of the news story by displaying it on a user interface.

* * * * *